(12) United States Patent
Nakamura et al.

(10) Patent No.: US 7,961,581 B2
(45) Date of Patent: Jun. 14, 2011

(54) METHOD AND APPARATUS FOR WRITING DATA ON STORAGE MEDIUM

(75) Inventors: Atsushi Nakamura, Moriguchi (JP); Shigeru Furumiya, Himeji (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/479,917

(22) Filed: Jun. 8, 2009

(65) Prior Publication Data

US 2009/0245060 A1  Oct. 1, 2009

Related U.S. Application Data

(63) Continuation of application No. 12/133,619, filed on Jun. 5, 2008, now Pat. No. 7,564,758, which is a continuation of application No. 10/551,573, filed as application No. PCT/JP2004/004224 on Mar. 25, 2004, now abandoned.

(30) Foreign Application Priority Data

Apr. 4, 2003 (JP) ................................. 2003-101248
Jul. 24, 2003 (JP) ................................. 2003-279108

(51) Int. Cl.
*G11B 7/00* (2006.01)
(52) U.S. Cl. ............... 369/59.11; 369/47.51; 369/59.12
(58) Field of Classification Search ............... 369/59.12, 369/59.11

See application file for complete search history.

(56) References Cited

U.S. PATENT DOCUMENTS

| | | | |
|---|---|---|---|
| 5,513,165 A | 4/1996 | Ide et al. | |
| 5,732,062 A | 3/1998 | Yokoi et al. | |
| 6,101,159 A | 8/2000 | Shoji et al. | |
| 6,256,277 B1 | 7/2001 | Saga et al. | |
| 6,493,305 B1 | 12/2002 | Hayashi et al. | |

(Continued)

FOREIGN PATENT DOCUMENTS

EP  1426930  6/2004

(Continued)

OTHER PUBLICATIONS

International Search Report for corresponding PCT/JP2004/004224, mailed, May 11, 2004.

(Continued)

*Primary Examiner* — Van N Chow
(74) *Attorney, Agent, or Firm* — Renner, Otto, Boisselle & Sklar, LLP

(57) ABSTRACT

A data recording method according to the present invention is a method for recording data as edge position information, including marks and spaces of multiple different lengths, on a storage medium by irradiating the storage medium with a pulsed energy beam. The method includes the steps of: (A) generating a write code sequence based on the data to be recorded; (B) determining a write pulse waveform, defining the power modulation of the energy beam, according to the code lengths of respective codes included in the write code sequence; and (C) modulating the power of the energy beam based on the write pulse waveform. If the shortest code length of the write code sequence is n (which is an integer equal to or greater than one), a write pulse waveform that has only one write pulse is assigned to recording mark making periods corresponding to codes with code lengths x of n, n+1 and n+2, and a write pulse waveform that has multiple write pulses Pw is assigned to recording mark making periods corresponding to codes with code lengths x of n+3 or more.

3 Claims, 13 Drawing Sheets

U.S. PATENT DOCUMENTS

| | | |
|---|---|---|
| 6,762,986 B1 | 7/2004 | Seo |
| 6,894,965 B2 * | 5/2005 | Furumiya et al. .......... 369/59.12 |
| 7,082,090 B2 | 7/2006 | Kato et al. |
| 7,227,826 B2 | 6/2007 | Miura et al. |
| 7,242,657 B2 | 7/2007 | Ito et al. |
| 7,272,095 B2 | 9/2007 | Shoji et al. |
| 7,489,612 B2 | 2/2009 | Shoji et al. |
| 7,489,614 B2 | 2/2009 | Shoji et al. |
| 7,492,689 B2 | 2/2009 | Shoji et al. |
| 7,551,536 B2 * | 6/2009 | Nakamura et al. ......... 369/59.11 |
| 7,907,490 B2 * | 3/2011 | Miyamoto et al. ......... 369/59.11 |
| 2003/0012917 A1 | 1/2003 | Harigaya et al. |
| 2006/0285477 A1 | 12/2006 | Shoji et al. |
| 2007/0291612 A1 | 12/2007 | Shoji et al. |
| 2009/0097374 A1 | 4/2009 | Shoji et al. |

FOREIGN PATENT DOCUMENTS

| | | |
|---|---|---|
| EP | 1596374 | 11/2005 |
| JP | 5-298737 | 11/1993 |
| JP | 08-007277 | 1/1996 |
| JP | 08-287465 | 11/1996 |
| JP | 9-134525 | 5/1997 |
| JP | 10-083573 | 3/1998 |
| JP | 11-175976 | 7/1999 |
| JP | 2003-030833 | 1/2003 |
| WO | 02/089121 | 11/2002 |
| WO | 03/023771 | 3/2003 |

OTHER PUBLICATIONS

European Search Report for corresponding Application No. 04723392.9 dated May 6, 2008.

Co-pending, U.S. Appl. No. 12/133,619, filed Jun. 5, 2008 (allowed claims attached.

Co-pending, U.S. Appl. No. 12/180,681, filed Jul. 28, 2008 (allowed claims attached).

European Search Report for corresponding application No. 08166676.0 issued Feb. 12, 2009.

* cited by examiner

FIRST PULSE INCIDENCE POINT

|  | 2T | 3T | 4T | ≥5T |
|---|---|---|---|---|
| $T_{TOP}$ |  |  |  |  |
| $dT_{TOP}$ |  |  |  |  |

LAST PULSE INCIDENCE POINT

|  | 2T | 3T | 4T | ≥5T |
|---|---|---|---|---|
| $T_{lp}$ | ╱ | ╱ | ╱ |  |
| $dT_{lp}$ |  |  |  |  |

FIG.13
(a) 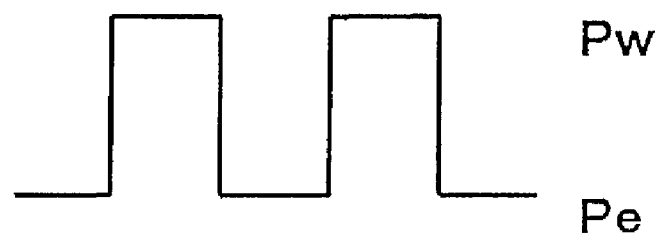
(b) 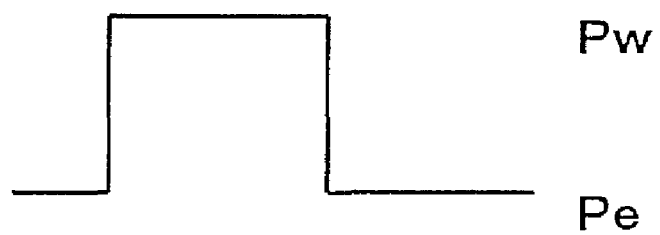
(c) 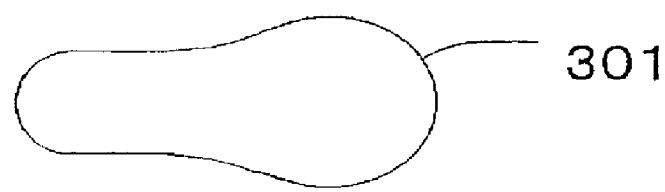
(d) 

METHOD AND APPARATUS FOR WRITING DATA ON STORAGE MEDIUM

This application is a continuation application of U.S. patent application Ser. No. 12/133,619 filed on Jun. 5, 2008 now U.S. Pat. No. 7,564,758 which is a continuation of U.S. application Ser. No. 10/551,573 filed on Oct. 3, 2005 now abandoned, which is a §371 of International Application No. PCT/JP2004/004224 filed Mar. 25, 2004, the entire disclosures of which are incorporated herein by reference, and is related to sibling U.S. application Ser. Nos. 12/133,651 and 12/133,666 both filed on Jun. 5, 2008 and 12/180,681 filed on Jul. 28, 2008.

TECHNICAL FIELD

The present invention relates to a method and apparatus for recording data (or information) on a storage medium such as an optical disk by irradiating the storage medium with a laser beam or any other energy beam so as to make a mark having a different physical property from a non-recorded portion thereof.

BACKGROUND ART

A rewritable optical disk such as a DVD-RAM has a phase change recording layer on its substrate. When this phase change recording layer is irradiated with a laser beam having a high energy density, the irradiated portion is locally heated to a temperature exceeding the melting point and melted. Since the optical disk being irradiated with the laser beam is spinning at a high velocity, the beam spot of the laser beam will be moving along the track on the phase change recording layer at a high velocity, too. That is why that portion of the phase change recording layer that has been melted by the passage of the beam spot is quickly cooled and solidified naturally. If the power of the laser beam is adjusted in such a situation, then the melted portion of the phase change recording layer is rapidly cooled and amorphized. The amorphized portion of the phase change recording layer has a different refractive index and a different optical reflectance from those of the other crystalline portions. The amorphized portion formed in this manner is called a "mark". On the other hand, an intervening portion between those "marks" on the track is called a "space".

By arranging those marks and spaces on the track, data can be recorded on the optical disk. If a laser beam with a low power for reading is radiated toward the optical disk and if the intensity of its reflected light is measured, then the mark/space boundary (which is often called a "mark edge") can be sensed and data can be read. The power of the read laser beam is kept low enough to avoid melting the phase change recording layer.

To increase the information transfer rate while data is being read from, or written on, any of those optical disks, either the recording linear density or the scanning rate of the beam spot on the optical disk may be increased.

In order to increase the recording linear density, it is effective to reduce the mark length and space length or to narrow the mark edge position detecting interval by reducing the steps of variations in mark and space lengths.

However, if the recording linear density were increased, then the SNR of the read signal would decrease. For that reason, a significant increase in recording linear density should not be expected.

To make very small marks on an optical disk with high precision, a write strategy, in which each of those marks is left on the recording layer by continuously irradiating that layer with either a single laser pulse or multiple laser pulses, is adopted.

According to a conventional technique as disclosed in Japanese Patent Application Laid-Open Publication No. 5-298737 (which will be referred to herein as a "first conventional technique"), a train of laser pulses is assigned to each of multiple marks with different lengths. In other words, a train of laser pulses to be radiated to make each mark, i.e., a waveform showing the intensity variation of the laser beam (which will be referred to herein as a "write pulse waveform"), is determined by the length of that mark to leave. The number and amplitude of pulses to be radiated during the period of making each mark are controlled according to the length of a write code sequence.

The write pulse waveform during the mark making period can be divided into a top portion and a succeeding portion. The respective pulses generally have different pulse heights. Also, in the periods other than the mark making period, a write auxiliary pulse is generated to follow the space.

According to the technique disclosed in Japanese Patent Application Laid-Open Publication No. 5-298737, the diffusion of heat from a preceding mark toward the front edge of the very next mark can be compensated for, and the mark width and mark edge position can be controlled with high precision, irrespective of the space length.

According to another conventional technique as disclosed in Japanese Patent Application Laid-Open Publication No. 8-7277 (which will be referred to herein as a "second conventional technique"), each write code is broken down into a plurality of primitive elements with multiple different lengths such that a single write pulse is associated with each of those elements. And each write code is formed by a series of recording marks associated with respectively independent write pulses.

Still another conventional technique as disclosed in Japanese Patent Application Laid-Open Publication No. 9-134525 (which will be referred to herein as a "third conventional technique") adopts a multi-pulse writing method that uses the first heating pulse, a number of succeeding heating and cooling pulses that follow the first pulse, and the last cooling pulse. According to the third conventional technique, in recording a mark, of which the length is either an odd number of times or an even number of times as long as one period of a write channel clock, the pulse width of the succeeding heating and cooling pulses is made nearly equal to the length of one period of the write channel clock.

According to yet another conventional technique as disclosed in Japanese Patent Application Laid-Open Publication No. 11-175976 (which will be referred to herein as a "fourth conventional technique"), the energy and the number of pulses that are applied while a mark of an arbitrary length is being made are changed according to the length of the mark in a write code sequence such that the gap between two arbitrary variation points of the energy applied per unit time during the mark making period becomes longer than a half of the detection window width.

According to the first conventional technique, the length of a mark, corresponding with the detection window width, is associated with one shot of write pulse. Thus, if the detection window width is shortened, then the semiconductor laser diode, functioning as a source of generating write energy, needs to be driven faster than usual. For example, if one tries to realize a burst transfer rate of 10 megabytes per second, which is almost as high as that of a magnetic disk drive, by a normal (1, 7) modulation technique, then the detection window width of the read signal will be about 8.3 ns (nanoseconds) and therefore the shortest write current pulse width will be about 4.2 ns, which is approximately a half as long as the detection window width. However, it usually takes several nanoseconds to activate a semiconductor laser, and it is difficult to generate a write beam pulse accurately. Also, even if a write beam pulse could be generated accurately, normal marks could not be made in a situation where multi-pulse writing is carried out on a medium such as a phase change disk in which the mark making is controlled by the cooling rate of its heated portion. This is because the next beam pulse is radiated before the heated portion is cooled sufficiently. Also, if one tries to realize a burst transfer rate of 10 megabytes per second by the (1, 7) modulation technique, for example, then the amount of time it takes to cool the storage medium will also be about 4.2 ns, which is equal to the shortest write current pulse width. Consequently, marks could not be made properly depending on the property of the storage medium.

According to the second conventional technique mentioned above, each write code is broken down into a plurality of primitive elements with multiple different lengths such that a single write pulse is associated with each of those elements and that each write code is formed by a series of recording marks associated with respectively independent write pulses. However, this conventional technique does not consider thermal balance between write pulses for respective elements at all. That is why as the recording linear density is increased, it becomes more and more difficult to control the mark edge position. That is to say, in making marks that will form a single write code, the recording marks will have variable widths from one position to another because the quantity of heat accumulated in the recording layer for the top portion of the write code is different from that of heat accumulated there for the terminal portion of the write code. As a result, the edge recording cannot be carried out as intended.

In the third conventional technique, a pulse, which is much shorter than the detection window width, may be inserted into the write pulse waveform in the vicinity of the center of the mark making period, and the mark width changes significantly around there compared to the other portions. According to the document disclosing this conventional technique, when a mark edge recording operation is carried out, the variation in signal amplitude around the center portion of a mark should cause no serious problem as long as the mark edge position is accurate. In a read/write drive that determines read/write conditions by detecting the average level of a read signal, however, such distortion of the read signal should affect the operation of the drive. As to a phase change storage medium, for example, a signal can be detected as a variation in reflectance just like a phase pit type storage medium. That is why the phase change storage medium and phase pit type storage medium can easily share the same read drive in common. However, since the read signal of the phase pit type storage medium has no such distortion, it is actually difficult to read the phase change storage medium and phase pit type storage medium using the same drive.

Also, according to the fourth conventional technique, the write power level of the write pulse train changes stepwise, thus requiring complicated power control. Also, in writing a signal with a code length of 4 Tw, the laser beam needs to be emitted so as to achieve a higher power level than the average power level at least for a period of time corresponding to 3 Tw. When a very small mark needs to be made on a high-density storage medium in the near future, such an emission time will be too long to make desired recording marks.

As can be seen, none of the conventional techniques mentioned above can contribute to making marks sufficiently accurately when the transfer rate is high or achieving sufficiently high storage plane density and reliability.

In order to overcome the problems described above, an object of the present invention is to provide a method and apparatus for recording data that can make marks with high accuracy even when the transfer rate is high.

DISCLOSURE OF INVENTION

A data recording method according to the present invention is a method for recording data as edge position information, including marks and spaces of multiple different lengths, on a storage medium by irradiating the storage medium with a pulsed energy beam. The method includes the steps of: (A) generating a write code sequence based on the data to be recorded; (B) determining a write pulse waveform, defining the power modulation of the energy beam, according to the code lengths of respective codes included in the write code sequence; and (C) modulating the power of the energy beam based on the write pulse waveform. If the shortest code length of the write code sequence is n (which is an integer equal to or greater than one), the step (B) includes assigning a write pulse waveform that has only one write pulse to recording mark making periods corresponding to codes with code lengths x of n, n+1 and n+2, and a write pulse waveform that has multiple write pulses Pw to recording mark making periods corresponding to codes with code lengths x of n+3 or more, respectively.

In one preferred embodiment, if the shortest code length of the write code sequence is n (which is an integer equal to or greater than one), the step (B) includes classifying the code lengths x into at least four lengths including n, n+1, n+2 and n+3 or more. As to two codes, which have code lengths m and m+1, respectively, and which have the same number of write pulses Pw in the recording mark making period of their write pulse waveforms, the step (B) includes determining the write pulse waveforms so as to satisfy the inequality: (write pulse width of code length m)≦(write pulse width of code length m+1), where the "write pulse width of code length m" is the width of an arbitrary Kth write pulse period included in the recording mark making period corresponding to the code length m and the "write pulse width of code length m+1" is the width of the Kth write pulse period included in the recording mark making period corresponding to the code length m+1.

In another preferred embodiment, as to two codes, which have code lengths m and m+1, respectively, and which have the same number of write pulses Pw and the same number of periods with a bottom power level Pb between two write pulses Pw in the recording mark making period of their write pulse waveforms, the step (B) includes determining the write pulse waveforms so as to satisfy the inequality: (pulse width of code length m)≦(pulse width of code length m+1), where the "pulse width of code length m" is the width of an arbitrary Kth period with the bottom power level Pb included in the recording mark making period corresponding to the code length m and the "pulse width of code length m+1" is the width of the Kth period with the bottom power level Pb included in the recording mark making period corresponding to the code length m+1.

In another preferred embodiment, the write pulse waveform in the recording mark making period corresponding to codes with code lengths x of n+3 or more includes write pulses, of which the number is equal to the quotient obtained by dividing (x−1) by two.

In another preferred embodiment, in the recording mark making period corresponding to codes with code lengths x of n+3 or more, the length of a period in which the write pulse waveform has an erasure power level Pe is set to be at least equal to 1 Tw.

In another preferred embodiment, in each said recording mark making period, the length of a period in which the write pulse waveform has the bottom power level Pb is set to be at least equal to 1 Tw.

In another preferred embodiment, in each said recording mark making period, the length of a period in which the write pulse waveform has a cooling power level Pc is set to be at least equal to 1 Tw.

In another preferred embodiment, the start position of the first pulse, included in a recording mark making period of the write pulse waveform, and the end position of a cooling pulse, also included in the recording mark making period, are shifted according to the length x of a code associated with the recording mark making period.

In another preferred embodiment, the positions are shifted to at least four different degrees corresponding to the code lengths x of n, n+1, n+2 and n+3 or more.

An apparatus according to the present invention is an apparatus for recording data as edge position information, including marks and spaces of multiple different lengths, on a storage medium by irradiating the storage medium with a pulsed energy beam. The apparatus includes: laser driving means for modulating the power of the energy beam; coding means for converting the data to be recorded on the storage medium into a write code sequence; and mark length classifying means for determining a write pulse waveform, defining the power modulation of the energy beam, according to the code lengths x of respective codes included in the write code sequence. If the shortest code length of the write code sequence is n (which is an integer equal to or greater than one), the mark length classifying means assigns a write pulse waveform that has only one write pulse Pw to recording mark making periods corresponding to codes with code lengths x of n, n+1 and n+2, and a write pulse waveform that has multiple write pulses Pw to recording mark making periods corresponding to codes with code lengths x of n+3 or more, respectively.

In one preferred embodiment, as to two codes, which have code lengths m and m+1, respectively, and which have the same number of write pulses Pw and the same number of periods with a bottom power level Pb between two write pulses Pw in the recording mark making period of their write pulse waveforms, the write pulse waveforms are determined so as to satisfy the inequality: (pulse width of code length m)≦(pulse width of code length m+1), where the "pulse width of code length m" is an arbitrary Kth period with the bottom power level included in the recording mark making period corresponding to the code length m and the "pulse width of code length m+1" is the Kth period with the bottom power level included in the recording mark making period corresponding to the code length m+1.

In another preferred embodiment, if the shortest code length of the write code sequence is n (which is an integer equal to or greater than one), the code lengths x are classified into at least four lengths including n, n+1, n+2 and n+3 or more. As to two codes, which have code lengths m and m+1, respectively, and which have the same number of write pulses Pw in the recording mark making period of their write pulse waveforms, the write pulse waveforms are determined so as to satisfy the inequality: (write pulse width of code length m)≦ (write pulse width of code length m+1), where the "write pulse width of code length m" is the width of an arbitrary Kth write pulse period included in the recording mark making period corresponding to the code length m and the "write pulse width of code length m+1" is the width of the Kth write pulse period included in the recording mark making period corresponding to the code length m+1.

In another preferred embodiment, as to two codes, which have code lengths m and m+1, respectively, and which have the same number of write pulses Pw and the same number of periods with a bottom power level Pb between two write pulses Pw in the recording mark making period of their write pulse waveforms, the write pulse waveforms are determined so as to satisfy the inequality: (pulse width of code length m)≦(pulse width of code length m+1), where the "pulse width of code length m" is the width of an arbitrary Kth period with the bottom power level Pb included in the recording mark making period corresponding to the code length m and the "pulse width of code length m+1" is the width of the Kth period with the bottom power level Pb included in the recording mark making period corresponding to the code length m+1.

In another preferred embodiment, the write pulse waveform in the recording mark making periods corresponding to codes with code lengths x of n+3 or more is determined so as to include a number of write pulses that is equal to the quotient obtained by dividing (x−1) by two.

In another preferred embodiment, the write pulse waveforms are determined such that every interval between trailing and leading edges of a fundamental waveform of a laser pulse in the mark making periods becomes at least equal to a detection window width Tw.

In another preferred embodiment, the apparatus includes pulse shifting means for shifting the start position of the first pulse, included in a recording mark making period of the write pulse waveform, and the end position of a cooling pulse, also included in the write pulse waveform, according to the length x of a code associated with the recording mark making period.

In another preferred embodiment, the apparatus includes write compensating means for shifting the positions to at least four different degrees corresponding to the code lengths x of n, n+1, n+2 and n+3 or more.

Another data recording method according to the present invention is a method for recording data as edge position information, including marks and spaces of multiple different lengths, on a storage medium by irradiating the storage medium with a pulsed energy beam. The method includes the steps of: (A) generating a write code sequence based on the data to be recorded; (B) determining a write pulse waveform, defining the power modulation of the energy beam, according to the code lengths of respective codes included in the write code sequence; and (C) modulating the power of the energy beam based on the write pulse waveform. The step (B) includes setting the number of write pulses Pw, included in respective recording mark making periods of the write pulse waveforms corresponding to code lengths n and n+1, to be equal to one, and making the width of the write pulse Pw, included in the recording mark making period of the write pulse waveform corresponding to the code length n, equal to or smaller than that of the write pulse Pw included in the recording mark making period of the write pulse waveform corresponding to the code length n+1. The step (B) also includes setting the number of write pulses Pw, included in respective recording mark making periods of the write pulse waveforms corresponding to code lengths n+2 and n+3, to be equal to two, and making the width of a first write pulse Pw, included in the recording mark making period of the write pulse waveform corresponding to the code length n+2, equal to or smaller than that of a first write pulse Pw included in the recording mark making period of the write pulse waveform corresponding to the code length n+3. And the step (B) further includes making the width of a second write pulse Pw, included in the recording mark making period of the write pulse waveform corresponding to a code length n+2, equal to or smaller than that of a second write pulse Pw included in the recording mark making period of the write pulse waveform corresponding to a code length n+3.

Still another data recording method according to the present invention is a method for recording data as edge position information, including marks and spaces of multiple different lengths, on a storage medium by irradiating the storage medium with a pulsed energy beam. The method includes the steps of: (A) generating a write code sequence based on the data to be recorded; (B) determining a write pulse waveform, defining the power modulation of the energy beam, according to the code lengths of respective codes included in the write code sequence; and (C) modulating the power of the energy beam based on the write pulse waveform. If the shortest code length of the write code sequence is n (which is an integer equal to or greater than one), the step (B) includes classifying the code lengths x into at least four lengths including n, n+1, n+2 and n+3 or more. As to two codes, which have code lengths m and m+1, respectively, and which have the same number of write pulses Pw in the recording mark making period of their write pulse waveforms, the step (B) includes determining the write pulse waveforms so as to satisfy the inequality: (write pulse width of code length m)$\leqq$(write pulse width of code length m+1), where the "write pulse width of code length m" is the width of an arbitrary Kth write pulse period included in the recording mark making period corresponding to the code length m and the "write pulse width of code length m+1" is the width of the Kth write pulse period included in the recording mark making period corresponding to the code length m+1.

Yet another data recording method according to the present invention is a method for recording data as edge position information, including marks and spaces of multiple different lengths, on a storage medium by irradiating the storage medium with a pulsed energy beam. The method includes the steps of: (A) generating a write code sequence based on the data to be recorded; (B) determining a write pulse waveform, defining the power modulation of the energy beam, according to the code lengths of respective codes included in the write code sequence; and (C) modulating the power of the energy beam based on the write pulse waveform. As to two codes, which have code lengths m and m+1, respectively, and which have the same number of write pulses Pw and the same number of periods with a bottom power level Pb between two write pulses Pw in the recording mark making period of their write pulse waveforms, the step (B) includes determining the write pulse waveforms so as to satisfy the inequality: (pulse width of code length m)$\leqq$(pulse width of code length m+1), where the "pulse width of code length m" is the width of an arbitrary Kth period with the bottom power level Pb included in the recording mark making period corresponding to the code length m and the "pulse width of code length m+1" is the width of the Kth period with the bottom power level Pb included in the recording mark making period corresponding to the code length m+1.

Another apparatus according to the present invention is an apparatus for recording data as edge position information, including marks and spaces of multiple different lengths, on a storage medium by irradiating the storage medium with a pulsed energy beam. The apparatus includes: laser driving means for modulating the power of the energy beam; coding means for converting the data to be recorded on the storage medium into a write code sequence; and mark length classifying means for determining a write pulse waveform, defining the power modulation of the energy beam, according to the code lengths x of respective codes included in the write code sequence. The mark length classifying means sets the number of write pulses Pw, included in respective recording mark making periods of the write pulse waveforms corresponding to code lengths n and n+1, to be equal to one, and makes the width of the write pulse Pw, included in the recording mark making period of the write pulse waveform corresponding to the code length n, equal to or smaller than that of the write pulse Pw included in the recording mark making period of the write pulse waveform corresponding to the code length n+1. The mark length classifying means also sets the number of write pulses Pw, included in respective recording mark making periods of the write pulse waveforms corresponding to code lengths n+2 and n+3, to be equal to two, and makes the width of a first write pulse Pw, included in the recording mark making period of the write pulse waveform corresponding to the code length n+2, equal to or smaller than that of a first write pulse Pw included in the recording mark making period of the write pulse waveform corresponding to the code length n+3. And the mark length classifying means further makes the width of a second write pulse Pw, included in the recording mark making period of the write pulse waveform corresponding to a code length n+2, equal to or smaller than that of a second write pulse Pw included in the recording mark making period of the write pulse waveform corresponding to a code length n+3.

Still another apparatus according to the present invention is an apparatus for recording data as edge position information, including marks and spaces of multiple different lengths, on a storage medium by irradiating the storage medium with a pulsed energy beam. The apparatus includes: laser driving means for modulating the power of the energy beam; coding means for converting the data to be recorded on the storage medium into a write code sequence; and mark length classifying means for determining a write pulse waveform, defining the power modulation of the energy beam, according to the code lengths x of respective codes included in the write code sequence. If the shortest code length of the write code sequence is n (which is an integer equal to or greater than one), the mark length classifying means classifies the code lengths x into at least four lengths including n, n+1, n+2 and n+3 or more. As to two codes, which have code lengths m and m+1, respectively, and which have the same number of write pulses Pw in the recording mark making period of their write pulse waveforms, the mark length classifying means determines the write pulse waveforms so as to satisfy the inequality: (write pulse width of code length m)$\leqq$(write pulse width of code length m+1), where the "write pulse width of code length m" is the width of an arbitrary Kth write pulse period included in the recording mark making period corresponding to the code length m and the "write pulse width of code length m+1" is the width of the Kth write pulse period included in the recording mark making period corresponding to the code length m+1.

Yet another apparatus according to the present invention is an apparatus for recording data as edge position information, including marks and spaces of multiple different lengths, on a storage medium by irradiating the storage medium with a pulsed energy beam. The apparatus includes: laser driving means for modulating the power of the energy beam; coding means for converting the data to be recorded on the storage medium into a write code sequence; and mark length classifying means for determining a write pulse waveform, defining the power modulation of the energy beam, according to the code lengths x of respective codes included in the write code sequence. As to two codes, which have code lengths m and m+1, respectively, and which have the same number of write pulses Pw and the same number of periods with a bottom power level Pb between two write pulses Pw in the recording mark making period of their write pulse waveforms, the mark length classifying means determines the write pulse waveforms so as to satisfy the inequality: (pulse width of code length m)≦(pulse width of code length m+1), where the "pulse width of code length m" is the width of an arbitrary Kth period with the bottom power level Pb included in the recording mark making period corresponding to the code length m and the "pulse width of code length m+1" is the width of the Kth period with the bottom power level Pb included in the recording mark making period corresponding to the code length m+1.

Yet another data recording method according to the present invention is a method for recording data as edge position information, including marks and spaces of multiple different lengths, on a storage medium by irradiating the storage medium with a pulsed energy beam. The method includes the steps of: (A) generating a write code sequence based on the data to be recorded; (B) determining a write pulse waveform, defining the power modulation of the energy beam, according to the code lengths of respective codes included in the write code sequence; and (C) modulating the power of the energy beam based on the write pulse waveform. As to two codes, which have code lengths m and m+1, respectively, and which have the same number of write pulses Pw in the recording mark making period of their write pulse waveforms, the write pulse waveforms are determined so as to satisfy the inequality: (write pulse width of code length m)≦(write pulse width of code length m+1), where the "write pulse width of code length m" is the width of an arbitrary Kth write pulse period included in the recording mark making period corresponding to the code length m and the "write pulse width of code length m+1" is the width of the Kth write pulse period included in the recording mark making period corresponding to the code length m+1.

Yet another data recording method according to the present invention is a method for recording data as edge position information, including marks and spaces of multiple different lengths, on a storage medium by irradiating the storage medium with a pulsed energy beam. The method includes the steps of: (A) generating a write code sequence based on the data to be recorded; (B) determining a write pulse waveform, defining the power modulation of the energy beam, according to the code lengths of respective codes included in the write code sequence; and (C) modulating the power of the energy beam based on the write pulse waveform. As to two codes, which have code lengths m and m+1, respectively, and which have the same number of write pulses Pw and the same number of periods with a bottom power level Pb between two write pulses Pw in the recording mark making period of their write pulse waveforms, the write pulse waveforms are determined so as to satisfy the inequality: (pulse width of code length m)≦(pulse width of code length m+1), where the "pulse width of code length m" is the width of an arbitrary Kth period with the bottom power level Pb included in the recording mark making period corresponding to the code length m and the "pulse width of code length m+1" is the width of the Kth period with the bottom power level Pb included in the recording mark making period corresponding to the code length m+1.

Figure 3:
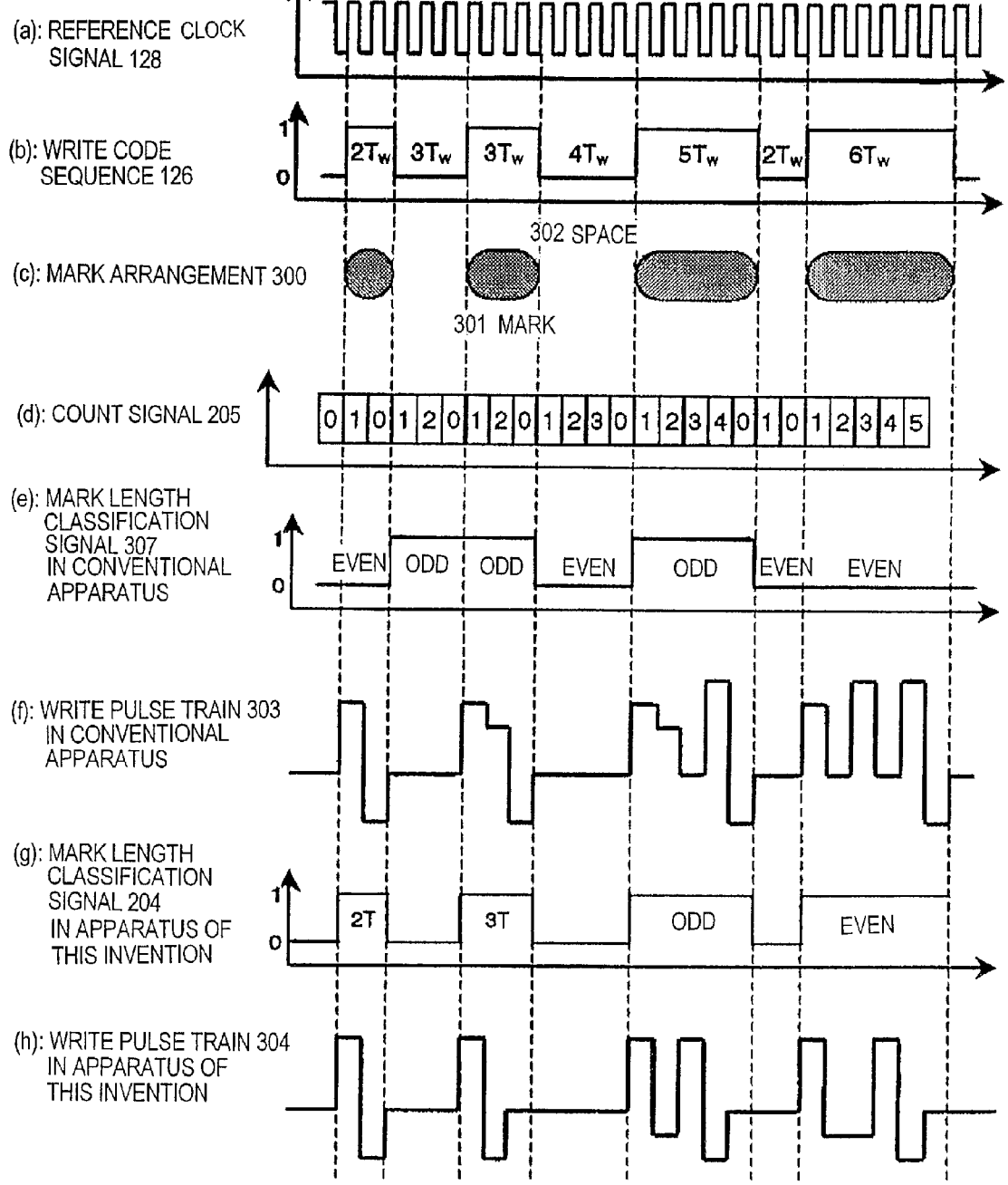

Portions (a) through (h) of FIG. 3 show how the recording processing system works in the present invention and in the prior art.

Figure 4:
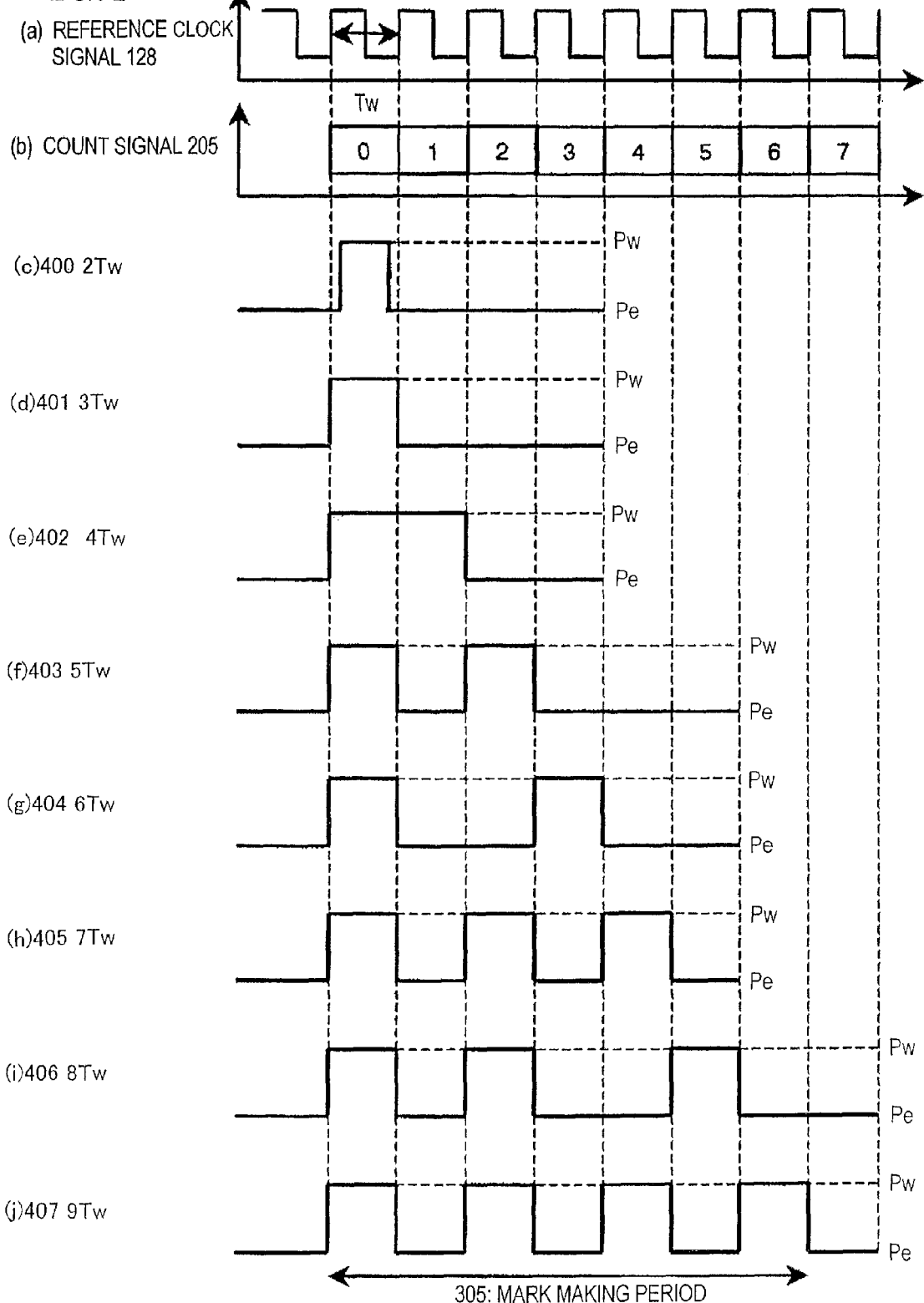

Portions (a) through (j) of FIG. 4 show write pulse waveforms adopted in a first preferred embodiment of an apparatus according to the present invention.

Figure 5:
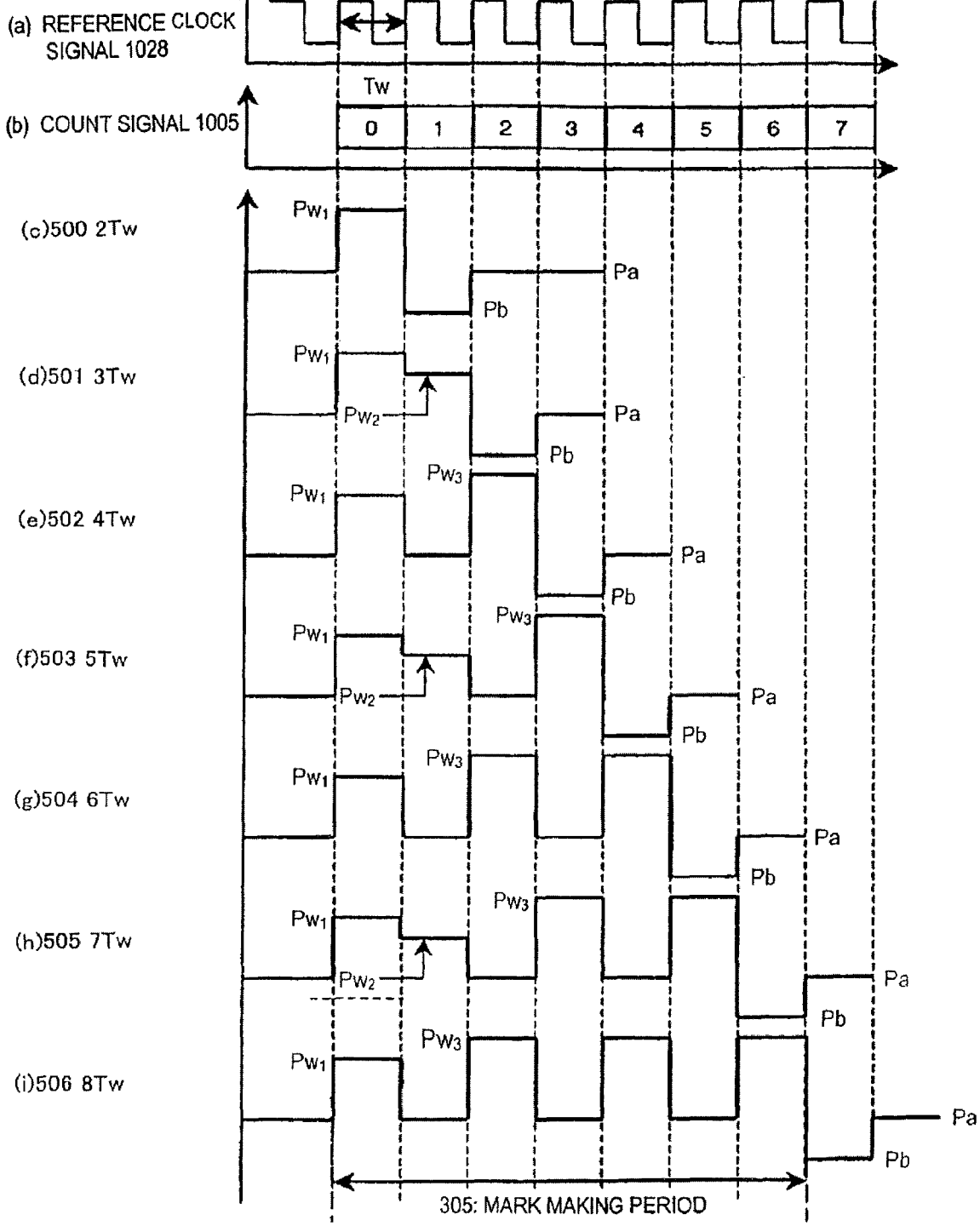

Portions (a) through (i) of FIG. 5 show write pulse waveforms for the recording processing system of a conventional data recorder (as a comparative example).

Figure 6:
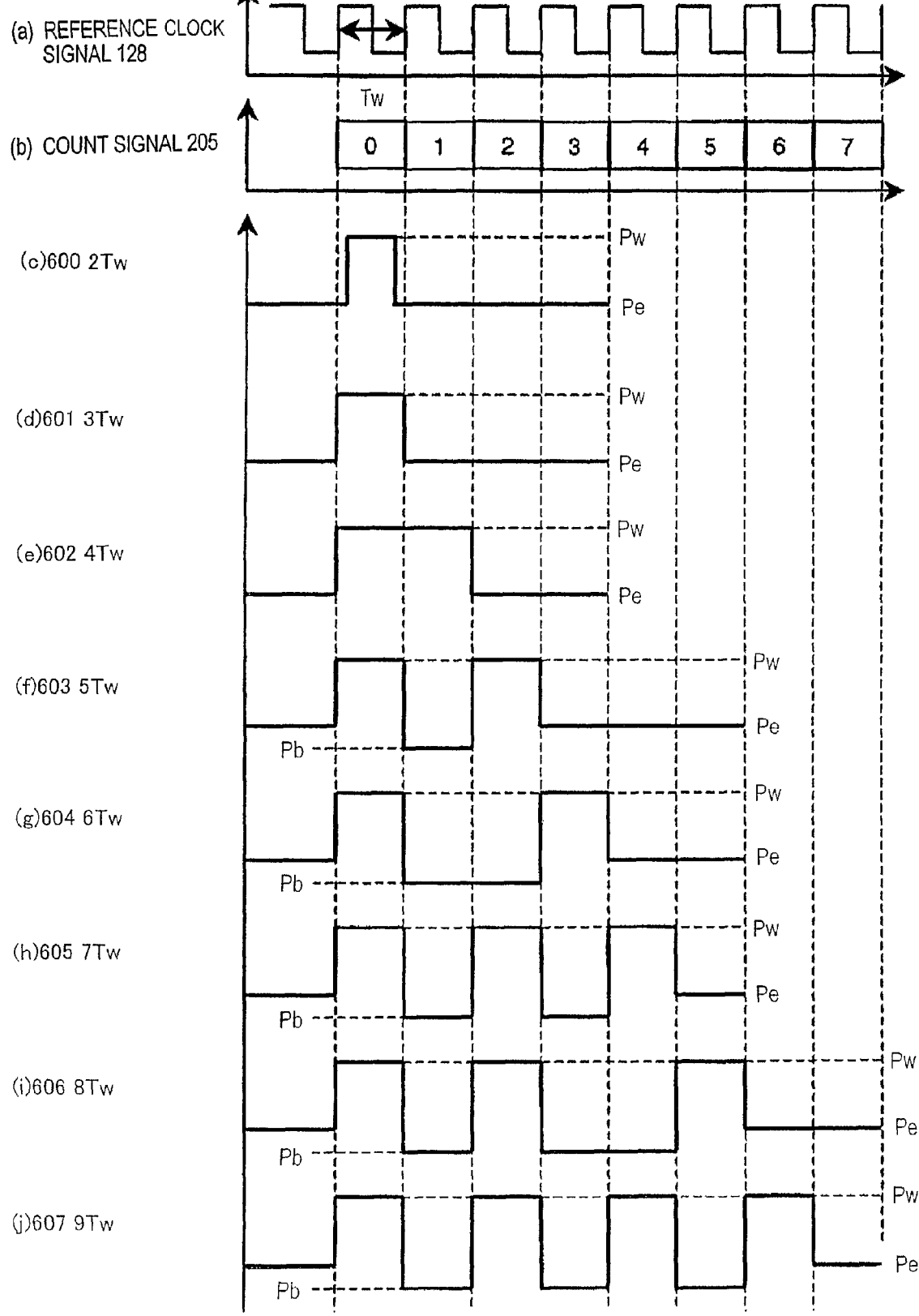

Portions (a) through (j) of FIG. 6 show write pulse waveforms adopted in a second preferred embodiment of an apparatus according to the present invention.

Figure 7:
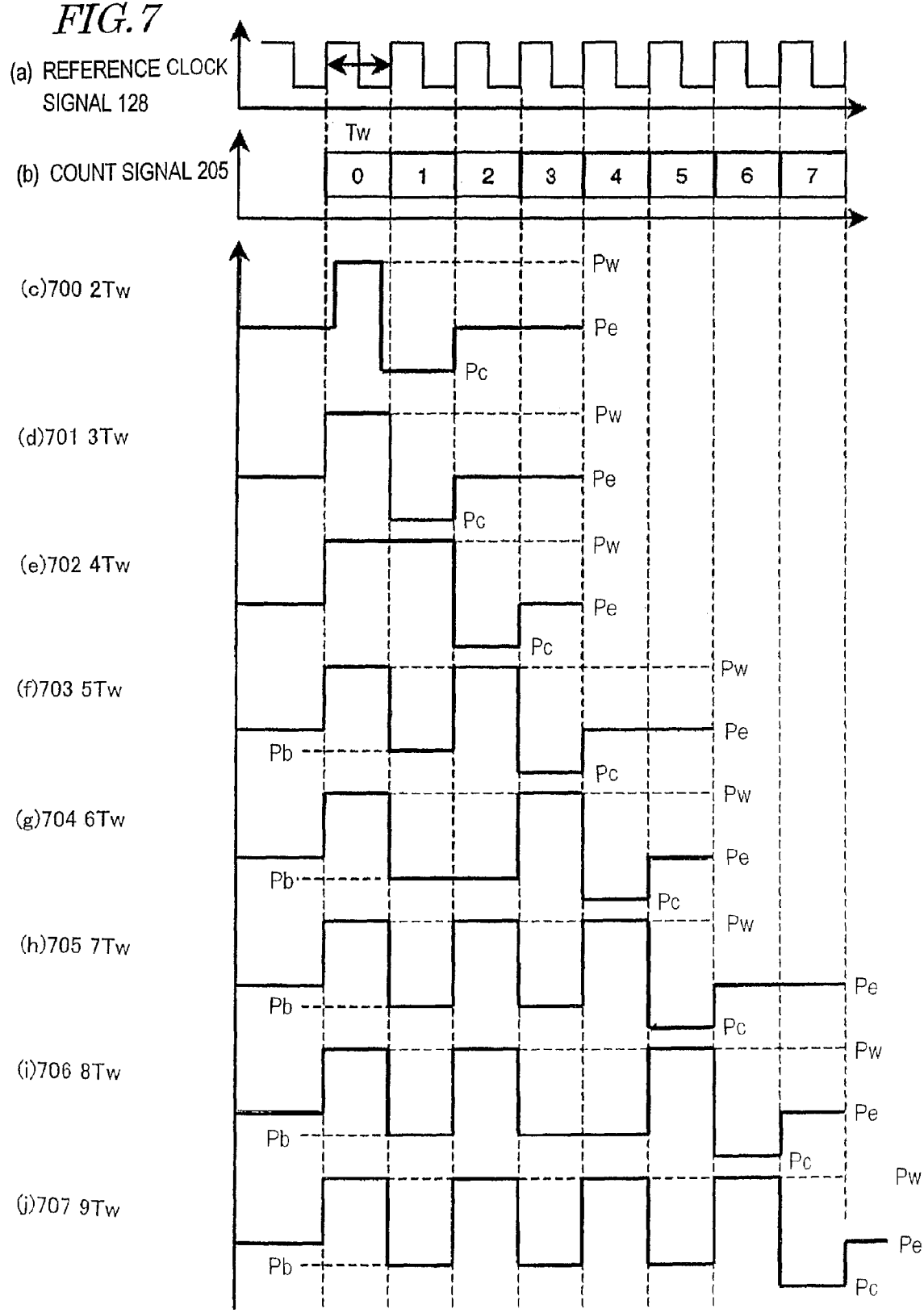

Portions (a) through (j) of FIG. 7 show write pulse waveforms adopted in a third preferred embodiment of an apparatus according to the present invention.

Figure 8:
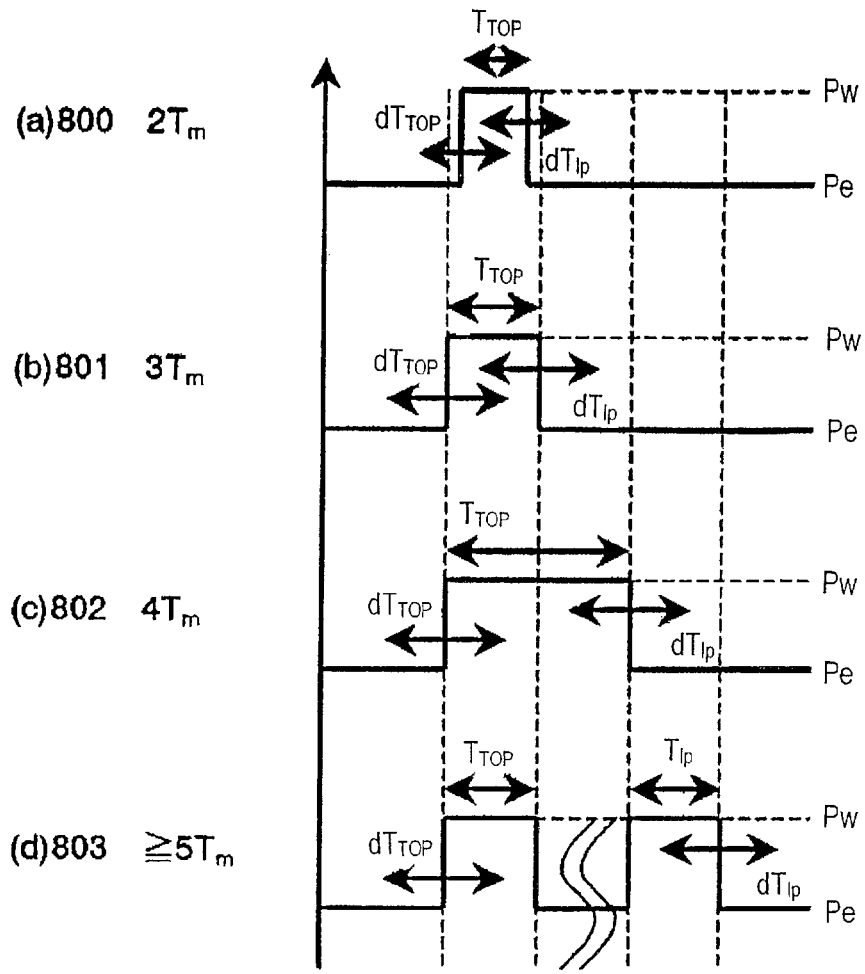

FIG. 8 shows how adaptive mark compensation can be done according to the present invention.

Figure 9:
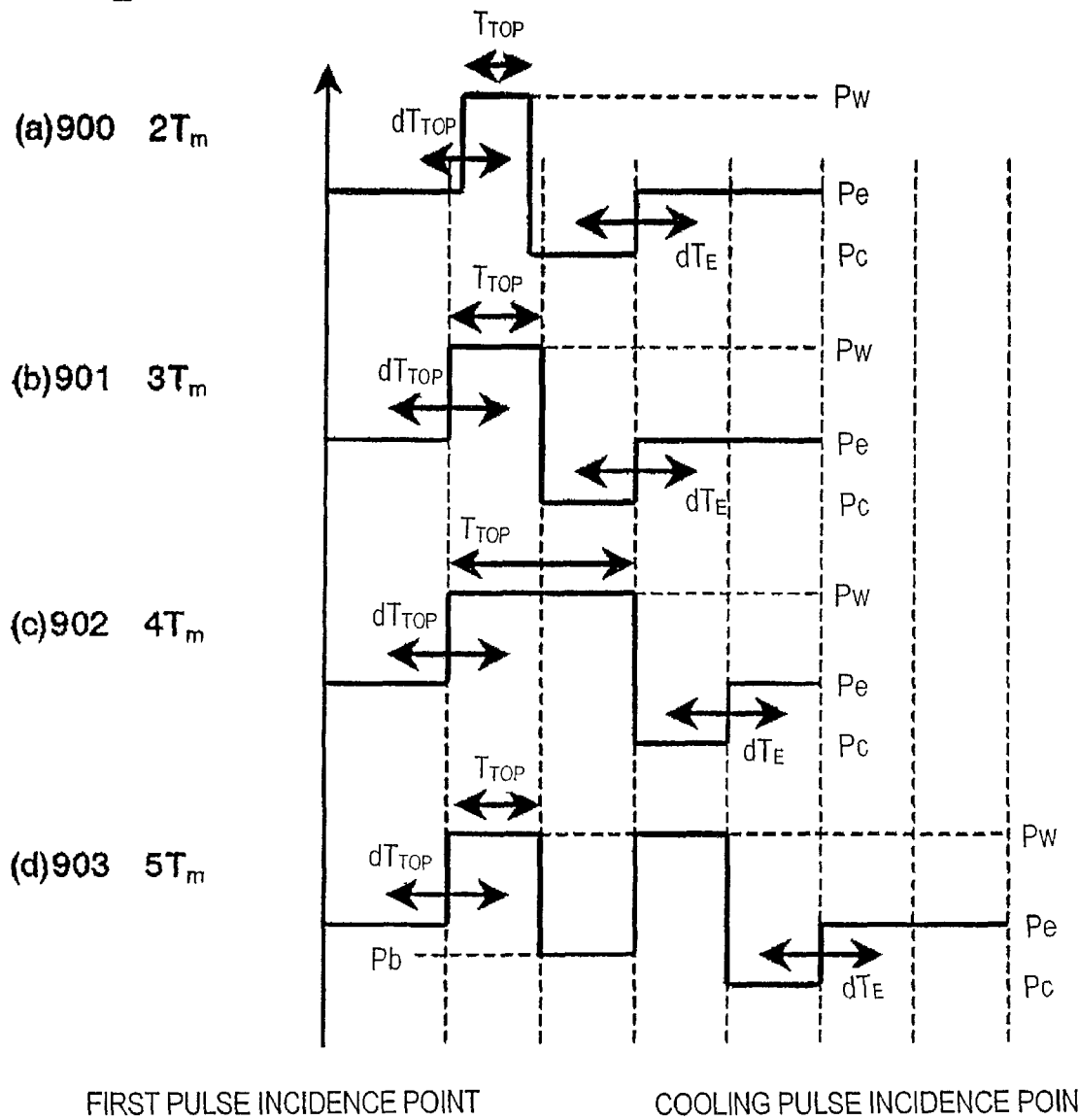

FIG. 9 shows how adaptive mark compensation can be done according to the present invention.

Figure 10:
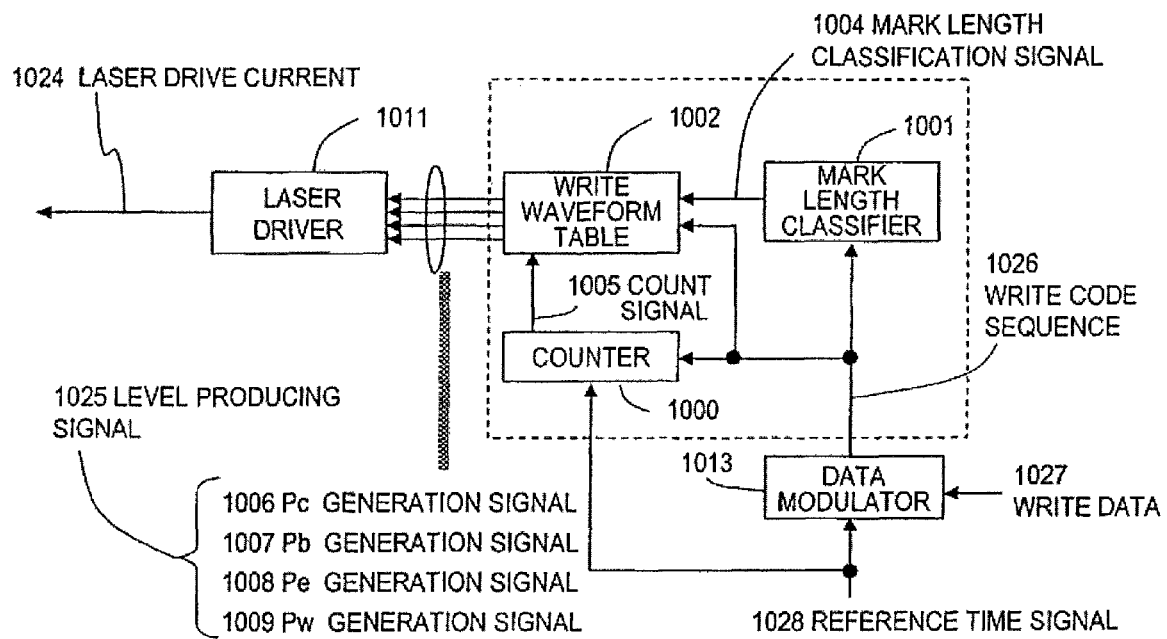

FIG. 10 shows a configuration for the recording processing system of a conventional data recorder.

Figure 11:
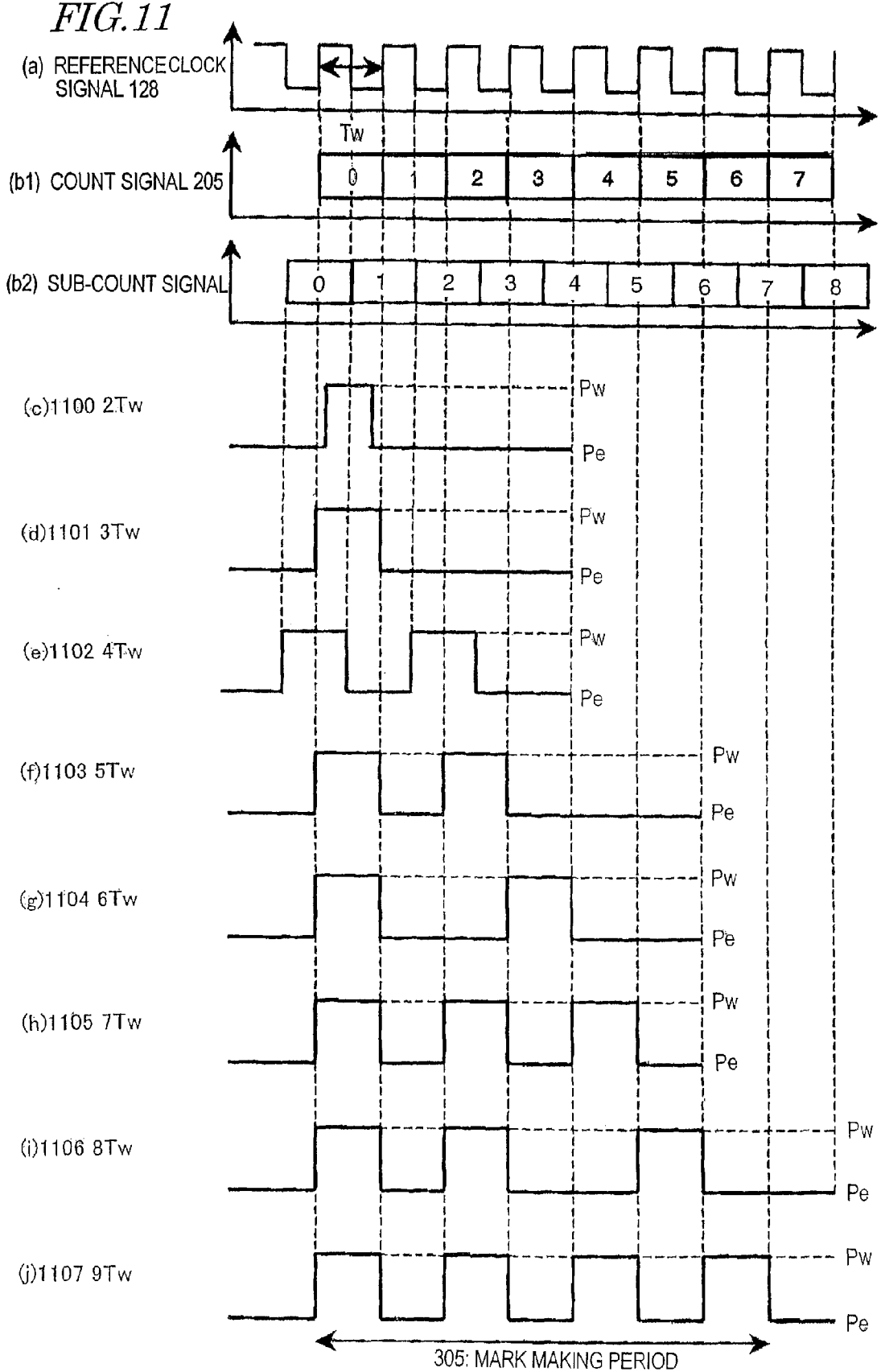

Portions (a) through (j) of FIG. 11 show write pulse waveforms adopted in a fourth preferred embodiment of an apparatus according to the present invention.

Figure 12:
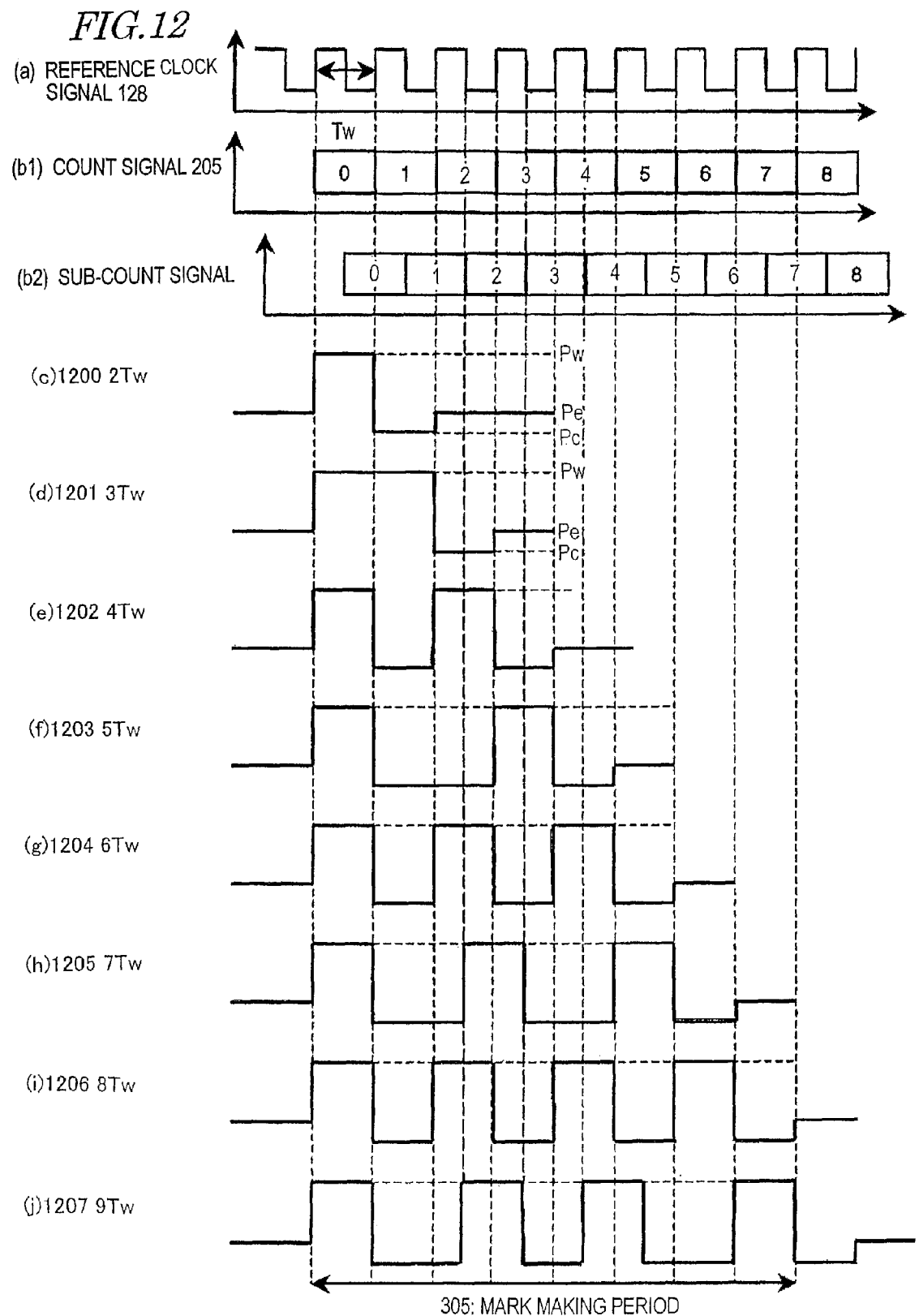

Portions (a) through (j) of FIG. 12 show write pulse waveforms adopted in a fifth preferred embodiment of an apparatus according to the present invention.

FIGS. 13(*a*) and 13(*b*) show two types of write pulse waveforms for making a 4 Tw mark, and FIGS. 13(*c*) and 13(*d*) schematically illustrate the shapes of marks left.

BEST MODE FOR CARRYING OUT THE INVENTION

In a conventional write strategy for optical disk drives, the number of pulses for multi-pulse writing is increased such that the resultant mark will not have an expanded end portion.

The present inventors discovered that when data needed to be recorded at a high rate, the mark shape could be kept appropriate by increasing the pulse width, not the number of pulses for multi-pulse writing, thus acquiring the basic idea of the present invention. Suppose the data transfer rate will go beyond 72 Mbps in the near future. In that case, according to the conventional write strategy that uses a lot of pulses for multi-pulse writing, a semiconductor laser, functioning as a light source in a drive for recording data, will need to have a further increased operating frequency. Actually, however, it is difficult to further increase the operating frequency of semiconductor lasers.

In contrast, in a preferred embodiment of the present invention, data is recorded with just one pulse applied in making relatively short marks with code lengths of 2 Tw to 4 Tw as will be described later, and there is no need to further improve the performance of semiconductor lasers. In addition, since resultant marks have appropriate shapes, read errors never increase, either.

Hereinafter, preferred embodiments of the present invention will be described with reference to the accompanying drawings.

Embodiment 1

A first preferred embodiment of a data recorder according to the present invention will be described.

In this preferred embodiment, a phase change optical disk is used as a storage medium. However, the storage media that may be used in the present invention are not limited to optical disks of that type. Any other type of storage medium can also be used effectively in the present invention as long as the storage medium can locally make a "mark" with a different physical property from the other portions by applying some non-optical energy such as magnetic energy or electron beam to the storage medium.

The present invention is characterized by its write strategy of controlling the level of energy applied to a storage medium in recording data on the storage medium (i.e., write energy) highly precisely. As used herein, the "write energy level" means the average energy level of a laser beam in a period of time that is approximately a half as long as the detection window width (which is a unit of variation in the edge position of marks and spaces). If a frequency component that is much higher than the frequency of a period corresponding to the detection window width is superposed on a write pulse waveform for some reason (e.g., to minimize laser noise), then the "write energy level" means an average energy level of a period of time that is long enough to neglect the influence of that frequency component.

Figure 1:
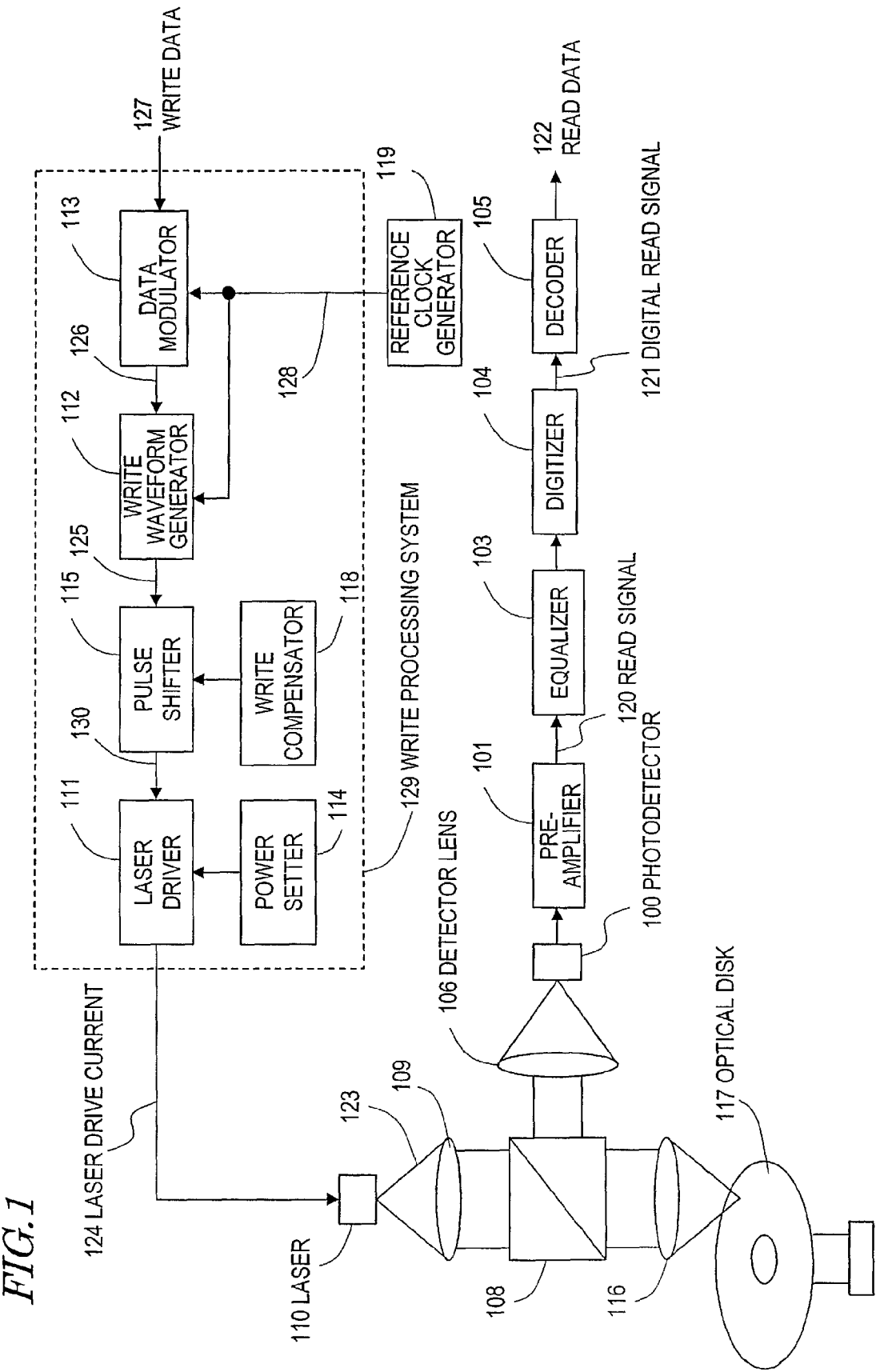
FIG. 1 shows an overall configuration for an apparatus according to the present invention.

First, referring to FIG. 1, illustrated is an overall configuration for a data recorder according to a preferred embodiment of the present invention. As shown in FIG. 1, the apparatus of this preferred embodiment includes an optical pickup, a write processing system and a read processing system.

The optical pickup includes a laser 110 for radiating a laser beam 123, a collimator lens 109 for transforming the laser beam 123 into parallel light, a half mirror 108, an objective lens 116 for condensing the laser beam 123 onto an optical disk 117, a detector lens 106 for condensing the light that has been reflected from the optical disk 117, a photodetector 100 for detecting the reflected light, and a pre-amplifier 101 for amplifying the output of the photodetector 100.

In this preferred embodiment, the laser 110 may be a semiconductor laser that oscillates at a wavelength of 405 nm and the objective lens 116 may have an NA of 0.85, for example. Only one laser 110 and its accompanying optical system are shown in FIG. 1. However, the single optical pickup may include a light source module for emitting laser beams with multiple different wavelengths and their associated optical systems.

The write processing system shown in FIG. 1 includes a data modulator 113 for converting write data 127 into a write code sequence (NRZI) 126, a write pulse waveform generator 112 for generating a level producing signal 125 based on the write code sequence (NRZI) 126, a pulse shifter 115 for generating a pulse generation signal 130 based on the level producing signal 125, and a laser driver 111 for outputting laser drive current 124 responsive to the pulse generation signal 130. A reference clock signal 128 is supplied from a reference clock generator 119 to the data modulator 113 and write pulse waveform generator 112. In this preferred embodiment, the reference clock signal 128 has a frequency of 72 MHz and a detection window width Tw of 7.58 ns. The write processing system further includes a power setter 114 and a write compensator 118.

The read processing system shown in FIG. 1 includes a equalizer 103 that receives the read signal 120 as the output signal of the pre-amplifier 101 of the optical pickup and subjects the signal to waveform equalizing process, a digitizer 104 for converting the read signal into a digital read signal 121, and a decoder 105 for generating read data 122 by decoding the digital read signal 121.

Next, it will be described how the data recorder shown in FIG. 1 operates.

The data modulator 113 of the write processing system receives the write data 127 to be written on the optical disk 117 and converts this write data 127 into the write code sequence (NRZI) 126 representing the marks and spaces to be made on the optical disk 117. The write wave generator 112 receives the write code sequence 126 and converts it into the level producing signal 125 corresponding to the write pulse waveform. The data modulator 113 and write pulse waveform generator 112 operate in response to the reference clock signal 128 generated by the reference clock generator 119.

The pulse shifter 115 receives the level producing signal 125 and forwards it as the pulse generation signal 130 to the laser driver 111. In this case, the pulse shifter 115 compensates for the pulsed waveform of the level generating signal 125 on the time axis in accordance with a write compensation table value of the write compensator 118, thereby making the pulse generation signal 130.

The laser driver 111 generates the laser drive current 124 responsive to the pulse generation signal 130. This laser drive current 124 is injected to the laser 110, thereby driving the laser 110. In accordance with a predetermined write pulse waveform, the laser 110 radiates the laser beam 123. In this manner, the power level of the laser beam 123 changes in accordance with the "write pulse waveform".

The laser beam 123 emitted from the laser 110 passes the collimator lens 109, half mirror 108 and objective lens 116 and is condensed onto the optical disk 117. The condensed pulsed laser beam 123 locally heats a portion of the phase change recording layer of the optical disk 117 that is spinning at a high velocity, thereby making marks and spaces along the track on the optical disk 117. In this case, if the phase change recording layer is irradiated with the pulsed laser beam 123 at short intervals, then the melted portions of the phase change recording layer will combine together to form a single long mark. The power level of the laser beam 123 depends on the write pulse waveform as described above. For that reason, if the write pulse waveform is controlled appropriately, a single long mark can be made by applying a plurality of pulses.

In reading data from the optical disk 117, the rows of marks on the optical disk 117 are scanned with the laser beam 123 with a power level that is low enough to avoid destroying (i.e., melting) the marks on the phase change recording layer. The light that has been reflected from the optical disk 117 passes the objective lens 116 and half mirror 108 and then enters the detector lens 106.

The laser beam that has been reflected from the optical disk 117 passes the detector lens 106 and then is condensed on the photodetector 100. According to the light intensity distribution of the laser beam on the photosensitive plane, the photodetector 100 converts the incoming light into an electrical signal. This electrical signal is amplified by the pre-amplifier 101 provided for the photodetector 100, thereby generating the read signal 120 that indicates whether or not there is a mark at the scan point on the optical disk 117.

The read signal 120 is subjected by the equalizer 103 to a waveform equalization process and then converted by the digitizer 104 into the digital read signal 121. The decoder 105 converts this digital read signal 121 in the opposite way to the data modulator 113, thereby generating the read data 122.

The optical disk 117 may be either a single-layer disk that has only one information storage layer or a double-layer disk that has two information storage layers. Also, the optical disk 117 may be either a rewritable optical disk that uses a phase change recording material or a write-once optical disk that allows the user to write data there only once.

The coding method does not have to be the (1, 7) modulation but may also be a 17 PP modulation or an 8-16 modulation. The 8-16 modulation has the shortest code length of 3 T. In that case, an extra code length of one may be added to this preferred embodiment that uses the (1, 7) modulation.

Figure 2:
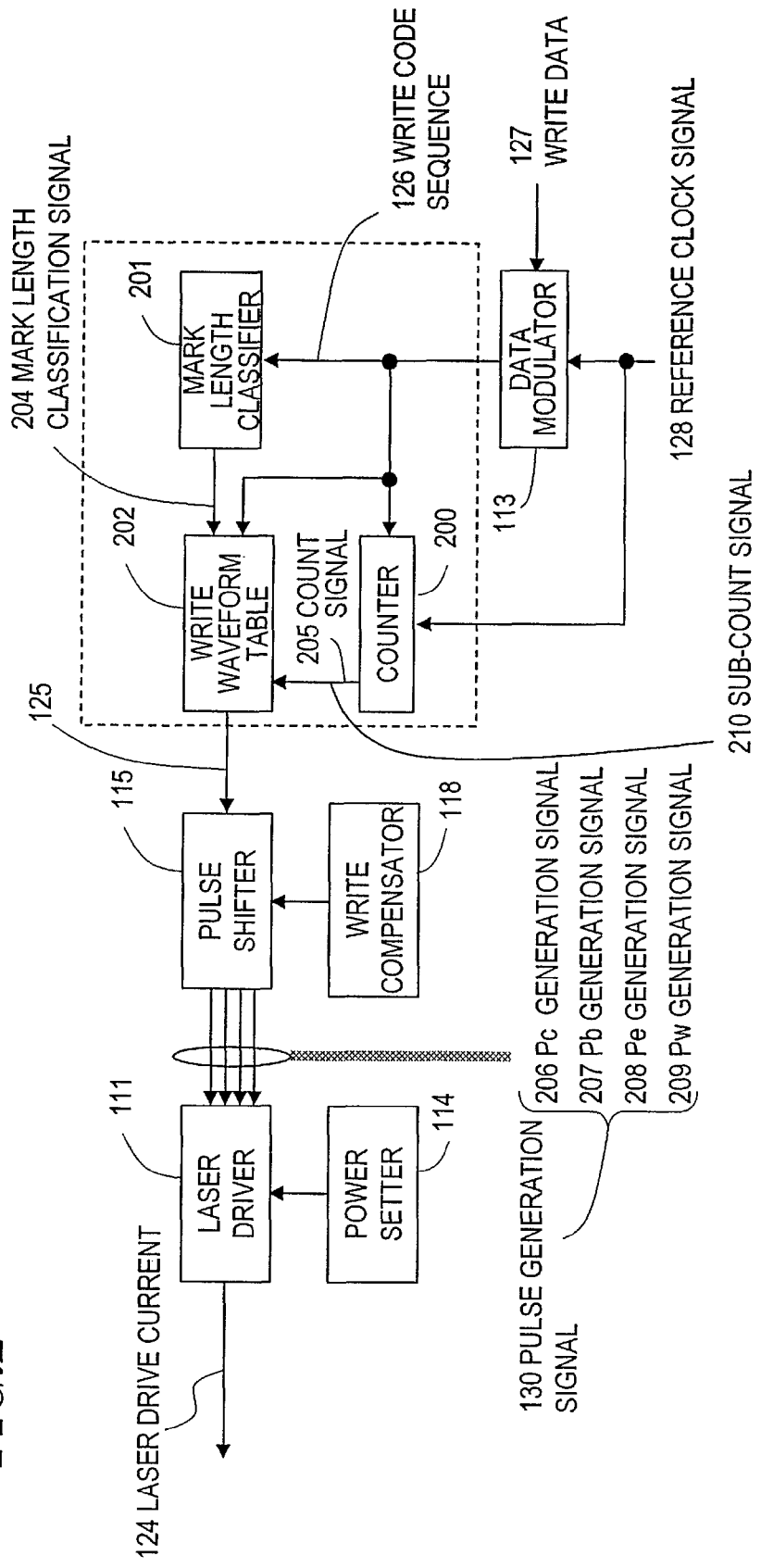
FIG. 2 shows a configuration for the recording processing system shown in FIG. 1.

Next, an exemplary configuration for the write processing system shown in FIG. 1 will be described in further detail with reference to FIG. 2.

The write data 127 is converted by the data modulator 113 into the write code sequence 126 representing mark lengths, space lengths, and information about their top positions. The write code sequence 126 is transmitted to a mark length classifier 201 and a write pulse waveform table 202. The mark length classifier 201 classifies the mark lengths of the write code sequence 126 following a predetermined rule and inputs the results as a mark length classification signal 204 to the write pulse waveform table 202.

The counter 200 refers to the write code sequence 126 and measures the length of time from a mark top position responsive to the reference clock signal 128, thereby generating a count signal 205. In accordance with the write code sequence 126, mark length classification signal 204 and count signal 205, the write pulse waveform table 202 outputs the level producing signal 125, reflecting a predetermined write pulse waveform, to the pulse shifter 115.

The pulsed waveform of the level producing signal 125 is compensated for on the time axis according to the write compensation table value of the write compensator 118 and then sent out as the pulse generation signal 130 to the laser driver 111. The pulse generation signal 130 includes a Pc generation signal 206, a Pb generation signal 207, a Pe generation signal 208 and a Pw generation signal 209 that represents a power level defining the write pulse waveform. Responsive to the pulse generation signal 130, the laser driver 111 drives the laser 110.

Next, the write code sequence of this preferred embodiment will be described with reference to portions (a) through (h) of FIG. 3. In some cases, the length or level of a portion of the write pulse waveform needs to be finely adjusted (i.e., write compensation needs to be carried out) in a certain period for some reason by reference to the preceding and succeeding write patterns and code lengths. In the following description of the write pulse waveform, when such write compensation is carried out, the write pulse waveform is supposed to be compared to the original write pulse waveform yet to be finely adjusted. For that reason, the write pulse waveform will be described on the supposition that the write pattern remains the same over a rather long distance before and after the mark to be made. As used herein, the "rather long distance" means a distance that is much longer than the distance on a medium to be affected by the application of the write energy for a period of time approximately corresponding to the detection window width.

Portion (a) of FIG. 3 shows the reference clock signal 128 that is used as a time reference for a write operation. Tw denotes one clock period.

Portion (b) of FIG. 3 shows the write code sequence 126 obtained by getting the write data subjected to the NRZI conversion by the data modulator 113. The signal waveform representing the write code sequence 126 changes between level "1" and level "0". The detection window width is equal to Tw, which is the minimum unit of variation in the mark or space length in the write code sequence 126.

Portion (c) of FIG. 3 schematically illustrates the planar shapes of marks and spaces to be actually recorded on the optical disk. The beam spot of the laser beam, which is incident on the optical disk to write data thereon, shifts from the left to the right in portion (c) of FIG. 3 while varying its power level, thereby leaving a series of marks shown in portion (c) of FIG. 3. The mark 301 shown in portion (c) of FIG. 3 is made so as to represent level "1" in the write code sequence 126. The length of the mark 301 is proportional to that of the period that has level "1" in the write code sequence 126.

Portion (d) of FIG. 3 shows the count signal 205, in which the amount of time that has passed since the top of the mark 301 or space 302 is measured on a Tw basis.

Portion (e) of FIG. 3 shows a mark length classification signal 307 in a conventional apparatus for the purpose of comparison. In this conventional apparatus, the mark lengths are classified into odd-number-of-times longer ones and even-number-of-times longer ones.

Portion (f) of FIG. 3 shows a write pulse waveform 303 in the conventional apparatus, which is the counterpart of the write code sequence 126 shown in portion (b) of FIG. 3. The write pulse waveform 303 is generated by reference to the count signal 205, write code sequence 126 and mark length classification signal 307.

Portion (g) of FIG. 3 shows the mark length classification signal 204 of this preferred embodiment. In this preferred embodiment, the mark lengths are classified into the shortest code length of 2 T, the second shortest code length of 3 T, the third shortest code length of 4 T, and the fourth shortest or less short code lengths, which are further classified into odd-number-of-times longer code lengths and even-number-of-times longer code lengths.

Portion (h) of FIG. 3 shows the write pulse waveform 304 of this preferred embodiment corresponding to the write code sequence 126 shown in portion (b) of FIG. 3. This write pulse waveform 304 is generated by reference to the count signal 205, write code sequence 126 and mark length classification signal 204. The shortest cooling time of this write pulse waveform 304 is about 1 Tw.

Hereinafter, signal waveforms for making marks according to the present invention will be described in detail with reference to FIG. 2 and portions (a) through (j) of FIG. 4. Portions (a) through (j) of FIG. 4 show write pulse waveforms 400 through 407, respectively.

In this preferred embodiment, the data modulator 113 (see FIG. 2) adopts a coding method in which the (1, 7) code modulation is followed by the NRZI modulation, each and every mark or space length falls within the range of 2 Tw to 8 Tw. This coding method is also applicable to even a situation where a signal of 9 Tw, for example, is intentionally inserted as a sync signal. However, this does not amend the coding rule of the data modulator 113. Rather, the present invention is applicable for use in the data modulator 113 that complies with any arbitrary coding rule (e.g., 8-16 modulation).

First, the mark length classifier 201 of this preferred embodiment classifies the code lengths n of the marks to be made into the four groups of 2 T, 3 T, 4 T and 5 T or more. If the code length n is 5 T or more, the mark length classifier 201 divides (n−1) by the divisor of two (i.e., performs a remainder calculation), thereby obtaining a quotient. Then, the mark length classifier 201 outputs this quotient as a mark length classification signal. For example, if the code length n is five, then (5−1)=4 and four divided by the divisor of two is two, which is the quotient obtained. Meanwhile, if the code length n is six, then (6−1)=5 and five divided by the divisor of two is also two, which means the same quotient is obtained. That is why the same mark length classification signal is output for a mark with 5 Tw length and a mark with a 6 Tw length.

By using such a mark length classification signal, the marks and spaces of the write code sequence can be classified into ones that are even-number-of-times as long as the detection window width Tw and ones that are odd-number-of-times as long as the detection window width Tw. In this preferred embodiment, the divisor is supposed to be two for the sake of simplicity. However, three or any other greater divisor may be used instead. Also, the mark length classifier 201 of this preferred embodiment operates so as to perform a remainder calculation. However, the present invention is in no way limited to this specific preferred embodiment.

Portions (a) through (j) of FIG. 4 will be referred to next.

Portion (a) of FIG. 4 shows the waveform of the reference clock signal 128, while portion (b) of FIG. 4 shows the count signal 205 generated by the counter 200. The amount of time that has passed since the top of a mark is counted on a detection window width (Tw) basis. The time at which the count signal goes zero corresponds to the top of a mark or space. Portions (c) through (j) of FIG. 4 show signal waveforms for making marks with 2 Tw to 9 Tw lengths, respectively.

As used herein, the "mark making period" is defined as a period of time between the leading edge of the first pulse and the trailing edge of the last pulse as shown in portion (j) of FIG. 4.

In making a mark with the 2 Tw length, the write pulse waveform during the mark making period consists of a single pulse with a length of 0.5 Tw to 1 Tw and a level Pw as shown in portion (c) of FIG. 4.

In making a mark with the 3 Tw length, the write pulse waveform during the mark making period consists of a single pulse with a length of 1 Tw or more but less than 2 Tw and with a level Pw as shown in portion (d) of FIG. 4. It should be noted that in this case, the mark making period is supposed to be longer than that of the 2 Tw long one by at least 0.5 Tw.

In making a mark with the 4 Tw length, the write pulse waveform during the mark making period consists of a single pulse with a length of 1.5 Tw or more but less than 2.5 Tw and with a level Pw as shown in portion (e) of FIG. 4. It should be noted that in this case, the mark making period is supposed to be longer than that of the 3 Tw long one by at least 0.5 Tw.

In a conventional data recorder such as a DVD player/recorder, a mark with the 4 Tw length is made by using a write pulse waveform that has two write pulses Pw during a single mark making period as shown in FIG. 13(a). As for DVDs, the write pulses have a wavelength of about 650 nm. In such an apparatus, if one tries to make a 4 Tw long mark using a single write pulse Pw such as that shown in FIG. 13(b), then the mark width broadens at the end portion as shown in FIG. 13(c). In contrast, according to this preferred embodiment, even by using a single write pulse such as that shown in FIG. 13(b), a mark of an appropriate shape can be made with good reproducibility as shown in FIG. 13(d).

A Blu-ray Disc (BD) is now being developed as a next-generation optical disk. In a BD, the laser beam for reading and writing has a wavelength of about 400 nm. Also, the material and composition of the storage layer of a BD are different from those of the storage layer of a DVD. Besides, BD and DVD have a lot of other differences in their physical structures. In a BD, the width and interval of the write pulses need to be narrower than those of a DVD. For that reason, if the data transfer rate increases, a 4 Tw long mark may have a deformed shape even when write pulses having the waveform shown in FIG. 13(a) are used. On the other hand, if a 4 Tw long mark is made by using a single write pulse such as that shown in FIG. 13(b), a mark of a preferred shape can also be obtained even in a BD.

In making a mark with the 5 Tw length, the write pulse waveform during the mark making period includes a pulse with a length of 1 TTw and a level Pw, which is followed by a period with a length of 1 Tw and a level Pe and then a period with a length of 1 Tw and a level Pw as shown in portion (f) of FIG. 4.

In making a mark with the 6 Tw length, the write pulse waveform during the mark making period includes a pulse with a length of 1 TTw and a level Pw, which is followed by a period with a length of 2 Tw and a level Pe and then a period with a length of 1 Tw and a level Pw as shown in portion (g) of FIG. 4.

In making a mark with the 7 Tw length and a mark with the 9 Tw length (i.e., odd-number-of-times longer marks with code lengths over 5 Tw and a detection window width Tw), the write pulse waveform during the mark making period includes an additional period with a length of 1 Tw and a level Pe and another additional period with a length of 1 Tw and a level Pw per mark length of 2 Tw at the center of the mark making period as shown in portions (h) and (j) of FIG. 4.

In making a mark with the 8 Tw length (i.e., an even-number-of-times longer mark with a code length more than 5 Tw and a detection window width Tw), the write pulse waveform during the mark making period includes an additional period with a length of 1 Tw and a level Pe and another additional period with a length of 1 Tw and a level Pw per mark length of 2 Tw at the center of the mark making period as shown in portion (i) of FIG. 4. Thus, in a situation where In a non-mark-making period, the level of the signal waveform is maintained at Pe until the next mark making period irrespective of the space length. In this preferred embodiment, the shortest Pe level period (i.e., the shortest cooling period) during the mark making period 305 has a length of 1 Tw.

According to this preferred embodiment that adopts such a write strategy, a mark of an appropriate shape can be made with good reproducibility without being affected by the rising or falling rate of the optical output of a semiconductor laser diode. For example, if the data transfer rate is 72 Mbps, then Tw becomes 7.6 ns. In this case, 0.5 Tw=3.8 ns. Accordingly, if the rising and falling rates of the optical output of the semiconductor laser diode are about 2 ns, neither the peak power level nor the bottom power level can be reached and no mark of a desired shape can be obtained. Meanwhile, by adopting the write strategy of this preferred embodiment, the laser power can be modulated just as represented by the write pulse waveform even without increasing the current rising and falling rates of the optical output of the semiconductor laser diode.

Also, in this preferred embodiment, as to two codes, which have code lengths m and m+1, respectively, and to which a write pulse waveform with the same number of write pulses Pw is assigned in the recording mark making period, the write pulse waveforms are determined so as to satisfy the inequality: (write pulse width of code length m)≦(write pulse width of code length m+1), where the "write pulse width of code length m" is the width of an arbitrary Kth write pulse period included in the period in which a recording mark with the code length m is made and the "write pulse width of code length m+1" is the width of an arbitrary Kth write pulse period included in the period in which a recording mark with the code length m+1 is made.

As a result, the marks can be made in even more appropriate shapes.

Furthermore, in this preferred embodiment, in a period in which a recording mark corresponding to a code with a code length x of (n+3) or more is made, a portion of the write pulse waveform with the erasure power level Pe has a length of at least 1 Tw. In that case, even if the optical output of the semiconductor laser diode has a rising or falling rate of about 2 ns, the laser power can be modulated with a desired write power. As a result, marks can be made with good reproducibility.

Embodiment 2

Hereinafter, a data recording method according to a second preferred embodiment of the present invention will be described with reference to FIG. 6.

The data recording method of this preferred embodiment can be carried out just by modifying the operation program for the data recorder of the first preferred embodiment described above. That is why the data recorder for use in this preferred embodiment has substantially the same configuration as the counterpart shown in FIGS. 1 and 2, and detailed description thereof will be omitted herein.

The write pulse waveforms 600 through 607 of this preferred embodiment will be described with reference to portions (a) through (j) of FIG. 6.

As can be seen easily by comparing portions (a) through (j) of FIG. 6 to the counterparts of FIG. 4, the signal waveforms 600 through 607 adopted in this preferred embodiment are similar to the signal waveforms 400 through 407 shown in FIG. 4. Among other things, the signal waveforms 600 through 602 are identical with the signal waveforms 400 through 402, respectively, as shown in portions (c) through (e) of FIG. 6. The difference between the first and second preferred embodiments lies in the shapes of signal waveforms with code lengths n exceeding 5 Tw.

Referring to portion (f) of FIG. 6, in making a mark with the 5 Tw length, the write pulse waveform includes a pulse with a length of 1 TTw and a level Pw, which is followed by a period with a length of 1 Tw and a level Pb and then a period with a length of 1 Tw and a level Pw. In this case, it should be noted that the level Pb in the period interposed between the two pulses is lower than the level Pe.

In making a mark with the 6 Tw length, the write pulse waveform includes a pulse with a length of 1 Tw and a level Pw, which is followed by a period with a length of 2 Tw and a level Pb and then a period with a length of 1 Tw and a level Pw as shown in portion (g) of FIG. 6.

In making odd-number-of-times longer marks with code lengths over 5 Tw and a detection window width Tw, the write pulse waveform includes an additional period with a length of 1 Tw and a level Pb and another additional period with a length of 1 Tw and a level Pw per mark length of 2 Tw at the center of the mark making period as shown in portions (h) and (j) of FIG. 6.

In making an even-number-of-times longer mark with a code length over 5 Tw and a detection window width Tw, the write pulse waveform includes an additional period with a length of 1 Tw and a level Pb and another additional period with a length of 1 Tw and a level Pw per mark length of 2 Tw at the center of the mark making period as shown in portion (i) of FIG. 6.

According to this preferred embodiment, as to two codes, which have code lengths m and m+1 (where m is an integer equal to or greater than one), respectively, and to which a write pulse waveform with the same number of write pulses Pw and the same number of periods with a bottom power level Pb between two write pulses Pw is assigned in a recording mark making period, the write pulse waveforms are determined so as to satisfy the inequality: (pulse width of code length m)≦(pulse width of code length m+1), where the "pulse width of code length m" is the width of an arbitrary Kth period with the bottom power level Pb included in the period in which a recording mark with the code length m is made and the "pulse width of code length m+1" is the width of an arbitrary Kth period with the bottom power level Pb included in the period in which a recording mark with the code length m+1 is made. The shorter the code length, the more easily the heat is accumulated in the end portion of a mark. However, by satisfying the inequality (pulse width of code length m)≦(pulse width of code length m+1), the accumulation of heat can be reduced and the mark shapes can be adjusted.

Furthermore, in this preferred embodiment, in each recording mark making period, a portion of the write pulse waveform with the bottom power level Pb has a length of at least 1 Tw. In that case, even if the optical output of the semiconductor laser diode has a rising or falling rate of about 2 ns, the laser power can be modulated with a desired write power. As a result, marks can be made with good reproducibility.

Embodiment 3

Hereinafter, a data recording method according to a third preferred embodiment of the present invention will be described with reference to FIG. 7.

The data recording method of this preferred embodiment can be carried out just by modifying the operation program for the data recorder of the first preferred embodiment described above. That is why the data recorder for use in this preferred embodiment has substantially the same configuration as the counterpart shown in FIGS. 1 and 2, and detailed description thereof will be omitted herein.

The write pulse waveforms 700 through 707 of this preferred embodiment will be described with reference to portions (a) through (j) of FIG. 7.

As can be seen easily by comparing portions (a) through (j) of FIG. 7 to the counterparts of FIG. 6, the signal waveforms 700 through 707 adopted in this preferred embodiment are similar to the signal waveforms 600 through 607 shown in FIG. 6. The difference between the second and third preferred embodiments is that a non-mark-making period begins with a period with a length of 1 Tw to 1.5 Tw and a level Pc and then the Pe level is maintained until the next mark making period. In this preferred embodiment, these levels Pc and Pb are supposed to be two different power levels. Alternatively, the levels Pc and Pb may be set equal to each other.

Embodiment 4

Hereinafter, a data recording method according to a fourth preferred embodiment of the present invention will be described with reference to FIG. 11.

The data recording method of this preferred embodiment can be carried out just by modifying the operation program for the data recorder of the first preferred embodiment described above. That is why the data recorder for use in this preferred embodiment has substantially the same configuration as the counterpart shown in FIGS. 1 and 2, and detailed description thereof will be omitted herein.

The write pulse waveforms 1100 through 1107 of this preferred embodiment will be described with reference to portions (a) through (j) of FIG. 11.

As can be seen easily by comparing portions (c) through (j) of FIG. 11 to the counterparts of FIG. 4, the signal waveforms 1100, 1101 and 1103 through 1107 adopted in this preferred embodiment are identical with the signal waveforms 400, 401 and 403 through 407 shown in FIG. 4. This preferred embodiment is characterized in that in making a mark with the 4 Tw length, the write pulse waveform includes a pulse with a length of 0.5 Tw and a level Pw, which is followed by a period with a length of 1 Tw and a level Pe and then a period with a length of 0.5 Tw and a level Pw as shown in portion (e) of FIG. 11. After that, the level Pe is maintained until the next mark making period.

Portion (b1) of FIG. 11 shows a count signal 205 generated by the counter 200 to measure the amount of time that has passed since the top of a mark on a detection window width (Tw) basis. The time at which the count signal goes zero corresponds to the top of a mark or a space.

Portion (b2) of FIG. 11 shows a sub-count signal 210 generated by the counter 200 and having a phase difference of 180 degrees with respect to the reference signal. The time at which this count signal goes zero has a phase lag of 180 degrees with respect to the top of a mark or a space.

As shown in portion (e) of FIG. 11, Pw has a pulse width of 0.5 Tw. However, this width may be any value that is equal to or greater than 0.5 Tw. In this case, either or both of the leading and trailing edges of each pulse are synchronous with the sub-count signal.

In this preferred embodiment, the trailing edge of the first pulse and the leading edge of the second pulse in the signal waveform 1102 with the 4 Tw length are synchronous with the sub-count signal 210.

Embodiment 5

Hereinafter, a data recording method according to a fifth preferred embodiment of the present invention will be described with reference to FIG. 12.

The data recording method of this preferred embodiment can be carried out just by modifying the operation program for the data recorder of the first preferred embodiment described above. That is why the data recorder for use in this preferred embodiment has substantially the same configuration as the counterpart shown in FIGS. 1 and 2, and detailed description thereof will be omitted herein.

The write pulse waveforms 1200 through 1207 of this preferred embodiment will be described with reference to portions (a) through (j) of FIG. 12.

Portion (a) of FIG. 12 shows the waveform of the reference clock signal 128. Portion (b1) of FIG. 12 shows a count signal 205 generated by the counter 200 to measure the amount of time that has passed since the top of a mark on a detection window width (Tw) basis. The time at which the count signal goes zero corresponds to the top of a mark or a space. Portion (b2) of FIG. 12 shows a sub-count signal 210 generated by the counter 200 and having a phase difference of 180 degrees with respect to the reference signal. The time at which this count signal goes zero has a phase lag of 180 degrees with respect to the top of a mark or a space.

In making a mark with the 2 Tw length, the write pulse waveform consists of a pulse with a length of 1 Tw and a level Pw as shown in portion (c) of FIG. 12. The non-mark-making period begins with a period with a length of 1 Tw and a level Pc and then maintains a level Pe until the next mark making period.

In making a mark with the 3 Tw length, the write pulse waveform consists of a pulse with a length of 2 Tw and a level Pw as shown in portion (d) of FIG. 12. The non-mark-making period begins with a period with a length of 1 Tw and a level Pc and then maintains a level Pe until the next mark making period. However, the mark making period is supposed to be longer than that of the 2 Tw long one by at least 0.5 Tw.

In making a mark with the 4 Tw length, the write pulse waveform includes a pulse with a length of 1 Tw and a level Pw, which is followed by a period with a length of 1 Tw and a level Pb and then a period with a length of 1 Tw and a level Pw as shown in portion (e) of FIG. 12. The non-mark-making period begins with a period with a length of 1 Tw and a level Pc and then maintains a level Pe until the next mark making period.

In making even-number-of-times longer marks with a detection window width Tw, the write pulse waveform includes an additional period with a length of 1 Tw and a level Pb and another additional period with a length of 1 Tw and a level Pw per mark length of 2 Tw at the center of the mark making period as shown in portions (g) and (i) of FIG. 12. The non-mark-making period begins with a period with a length of 1 Tw and a level Pc and then maintains a level Pe until the next mark making period.

In making a mark with the 5 Tw length, the write pulse waveform includes a pulse with a length of 1 Tw and a level Pw, which is followed by a period with a length of 2 Tw and a level Pb and then a period with a length of 1 Tw and a level Pw as shown in portion (f) of FIG. 12. The non-mark-making period begins with a period with a length of 1 Tw and a level Pc and then maintains a level Pe until the next mark making period.

In making a mark with the 7 Tw length, the write pulse waveform includes a pulse with a length of 1 Tw and a level Pw, which is followed by a period with a length of 1.5 Tw and a level Pb, a period with a length of 1 Tw and a level Pw, and then a period with a length of 1.5 Tw and a level Pb as shown in portion (h) of FIG. 12. The non-mark-making period begins with a period with a length of 1 Tw and a level Pc and then maintains a level Pe until the next mark making period.

In this case, either or both of the leading and trailing edges of the intermediate pulse is/are synchronous with the sub-count signal. In FIG. 12, the leading and trailing edges of the second pulse are synchronous with the sub-count signal.

After that, in making odd-number-of-times longer marks with a detection window width Tw, a period with a length of 1 Tw and a level Pb and another period with a length of 1 Tw and a level Pw are added per mark length of 2 Tw to the center of the mark making period as shown in portion (j) of FIG. 12. The non-mark-making period begins with a period with a length of 1 Tw and a level Pc and then maintains a level Pe until the next mark making period.

In some waveforms of this preferred embodiment, the level Pe is supposed to be the same as the level Pb or Pc. However, the level Pe may be different from the level Pb or Pc.

Next, an example of adaptive mark compensation will be described with reference to the accompanying drawings. A high-density optical write operation sometimes causes write interference in which mark edges shift depending on the writing conditions. To prevent the write signal from being deteriorated by such interference, adaptive mark compensation may be carried out.

The adaptive mark compensation means a compensation operation of changing the top incidence points or pulse widths of the laser beam according to the length of the given mark, i.e., whether the length of the mark is 2 T (2 Tm), 3 T (3 Tm), 4T (4 Tm) or 5 T or more ($\geq$5 Tm), as shown in FIG. 8.

FIG. 8 shows exemplary adaptive mark compensation in a situation where the write power is represented by binary values. By shifting dTtop and Ttop with respect to the beginning of the mark and also shifting Tlp or dtlp with respect to the end of the recording mark according to the code length of the recording mark among other parameters described above, the edge shifting at the beginning and end of the mark can be minimized and good signal quality is realized.

FIG. 9 shows exemplary adaptive mark compensation in a situation where the write power is represented by four values. By shifting dTtop and Ttop with respect to the beginning of the mark and also shifting dTe with respect to the end of the recording mark according to the code length of the recording mark among other parameters described above, the edge shifting at the beginning and end of the mark can be minimized and good signal quality is realized. Although the write power is supposed to be represented by four values in this example, the same mark compensation is equally applicable to even a situation where three values are used by setting Pb=Pc.

The magnitude of shift that can be caused by the write compensation may be defined by a very small step (of Tw/16, for example) with respect to the reference clock signal using a delay line, for instance.

Also, the write compensation may be started either from a point in time on the fundamental waveform responsive to the count signal or another point in time responsive to the sub-count signal.

In the fundamental waveform of this preferred embodiment, each pulse width and the widths of a period with the bottom power level and a period with the cooling power level in each mark making period are supposed to be at least equal to 1 T. However, after the write compensation has been done, each pulse for a mark of any of various lengths preferably has a width of at least 0.5 Tw. In that case, the writing conditions can be relaxed without being affected by the laser response speed so much.

Comparative Example

Hereinafter, the patterns of write pulse waveforms 500 through 506 for an apparatus of a comparative example will be described with reference to portions (a) through (j) of FIG. 5 and FIG. 10.

First, referring to FIG. 10, illustrated is a configuration for the write processing system of this apparatus.

The data modulator 1013 shown in FIG. 10 receives write data 1027 and converts it into a write code sequence 1026. The mark length classifier 1001 divides the code length n by the divisor of two (i.e., performs a remainder calculation) on the write code sequence 1025. This mark length classifier 1001 classifies the marks and spaces of the write code sequence into ones of which the lengths are even numbers of times as long as the detection window width Tw and ones of which the lengths are odd numbers of times as long as the detection window width Tw.

The counter 1000 measures the length of time from a mark top position on a detection window width Tw basis, thereby generating a count signal 1005. Portion (b) of FIG. 5 shows the count signal 1005. The time at which the count signal 1005 goes zero corresponds to the top of a mark or space.

A reference clock signal 1028 is input to the counter 1000 and the data modulator 1013. The count signal 1005 is input to the write pulse waveform table 1002, which outputs a level producing signal 1025 to the laser driver 1011. In response, the laser driver 1011 outputs laser drive current 1024.

Portion (c) of FIG. 5 shows a write pulse waveform while a mark with the 2 Tw length is being made. The mark making period 305 includes a pulse with a length of 1 Tw and a level Pw1. The non-mark-making period begins with a period with a length of 1 Tw and a level Pb and then maintains a level Pa until the next mark making period.

Portion (d) of FIG. 5 shows a write pulse waveform while a mark with the 3 Tw length is being made. The mark making period 305 includes a pulse with the same length of 1 Tw and the same level Pw1 as the counterpart shown in portion (c) of FIG. 5, which is followed by a period with a length of 1 Tw and a level Pw2. The non-mark-making period begins with a period with a length of 1 Tw and a level Pb and then maintains the level Pa until the next mark making period just like the write pulse waveform shown in portion (c) of FIG. 5. The non-mark-making period has the same waveform in any of portions (e) and (f) of FIG. 5. That is to say, irrespective of the length of the space, every non-mark-making period begins with a period with a length of 1 Tw and a level Pb and then maintains the level Pa until the next mark making period. Thus, the shortest cooling period in the mark making period 305 has a length of 1 Tw.

Portion (e) of FIG. 5 shows a write pulse waveform while a mark with the 4 Tw length is being made. The mark making period 305 includes a pulse with the same length of 1 Tw and the same level Pw1 as the counterpart shown in portion (c) of FIG. 5, which is followed by a period with a length of 1 Tw and a level Pa and then a period with a length of 1 Tw and a level Pw3.

Portions (f) and (h) of FIG. 5 show write pulse waveforms in making marks with 5 Tw and 7 Tw lengths, respectively. Thus, in making a mark of which the length is an odd number of times as long as the detection window width Tw, a period with a length of 1 Tw and a level Pa and another period with a length of 1 Tw and a level Pw3 are added per mark length of 2 Tw to the end of the mark making period. The non-mark-making period always begins with a period with a length of 1 Tw and a level Pb irrespective of the space length and then maintains the level Pa until the next mark making period.

Portions (g) and (i) of FIG. 5 show write pulse waveforms in making marks with 6 Tw and 8 Tw lengths, respectively. Thus, in making a mark of which the length is an even number of times as long as the detection window width Tw, a period with a length of 1 Tw and a level Pa and another period with a length of 1 Tw and a level Pw3 are added per mark length of 2 Tw to the end of the mark making period.

In this comparative example, the write power of the write pulse train changes stepwise, thus requiring a more complicated power control than any preferred embodiment of the present invention. Also, in recording a mark with a code length of 4 Tw, the semiconductor laser diode needs to emit radiation at a higher power level than the average power level at least during a period with the 3 Tw length. When the storage density of optical disks rises in the near future to the point that very small marks need to be made, the radiation will have to be emitted for too long a time in the comparative example. As a result, marks of a desired shape will not be obtained.

Industrial Applicability

According to the present invention, an apparatus for recording data on a storage medium by applying energy to the storage medium and making marks that have a different physical property from the non-recorded portion can make those marks quickly and accurately. As a result, the mark edge recording technique, which will effectively contribute to increasing the recording linear density, can be adopted as the method of recording.

Consequently, the read/write operations can be done more quickly and with more reliability, and yet the sizes of the apparatus for recording information and the storage medium can be reduced as well. That is why the present invention is very cost-effective.

The invention claimed is:
1. A data recording method for recording data as edge position information, including marks and spaces of multiple different lengths, on a storage medium by irradiating the storage medium with a pulsed energy beam, the method comprising:

(A) generating an NRZI data based on the data to be recorded;

(B) determining a write pulse waveform, defining the power modulation of the energy beam, according to the code lengths x of respective codes included in the NRZI data, the code lengths x (where x is an integer equal to or greater than one) corresponding to mark lengths of xTw (where Tw is a detection window width); and (C) modulating the power of the energy beam based on the write pulse waveform, wherein if the shortest code length of the NRZI data is n (where n is an integer equal to or greater than one), the step (B) includes assigning a write pulse waveform that has only one write pulse Pw, followed by a cooling pulse, to recording mark making periods corresponding to codes with code lengths x of n, and n+1, and a write pulse waveform that has multiple write pulses Pw, followed by a cooling pulse, to recording mark making periods corresponding to codes with code lengths x of n+2 or more, respectively, wherein the write pulse waveform in the recording mark making period corresponding to codes with code lengths x of n+2 or more includes write pulses, of which the number is equal to the quotient obtained by dividing x by two, and wherein the start position of a first pulse among the write pulse or write pulses Pw of the write pulse waveform that is included in a recording mark making period is shifted to adjust the start position of the first pulse, wherein the start position of the first pulse is defined by a distance from a synchronization position of a reference clock that is used for forming the NRZI data, wherein the code lengths x are classified into at least four groups, and each of four code lengths x of n, n+1, n+2 and n+3 belongs to different one of the at least four groups, and wherein the width of the first pulse and the shift of the start position of the first pulse are adjusted according to the at least four groups.

2. A storage medium comprising a recording region for recording data as edge position information, including marks and spaces of multiple different lengths, on a storage medium by being irradiated with a pulsed energy beam, wherein a power modulation of the energy beam is defined by a write pulse waveform, according to the code lengths of respective codes included in an NRZI data that is generated based on data to be recorded, the code lengths x (where x is an integer equal to or greater than one) corresponding to a mark length xTw (where Tw is a detection window width); and wherein if the shortest code length of the NRZI data is n (where n is an integer equal to or greater than one), each write pulse waveform for code lengths x of n and n+1 has only one write pulse, followed by a cooling pulse, and each write pulse waveform for code lengths x of n+2 or more has multiple write pulses, followed by a cooling pulse, wherein the write pulse waveform in the recording mark making period corresponding to codes with code lengths x of n+2 or more includes write pulses, of which the number is equal to the quotient obtained by dividing x by two, and wherein the start position of a first pulse among the write pulse or pulses Pw of the write pulse waveform that is included in a recording mark making period is shifted to adjust the start position of the first pulse, wherein the start position of the first pulse is defined by a distance from a synchronization position of a reference clock that is used for forming the NRZI data, wherein the code lengths x are classified into at least four groups, and each of four code lengths x of n, n+1, n+2 and n+3 belongs to different one of the at least four groups, and wherein the width of the first pulse and the shift of the start position of the first pulse are adjusted according to the at least four groups.

3. A data reproduction method for reproducing data recorded on the storage medium according to claim 2, the method comprising:

reproducing the data recorded on the recording region of the storage medium by irradiating the storage medium with a light beam.

* * * * *